United States Patent
Kakko et al.

(10) Patent No.: US 12,442,826 B2
(45) Date of Patent: Oct. 14, 2025

(54) LATERAL FLOW TEST STRIP READERS, CARTRIDGES AND RELATED METHODS

(71) Applicant: WALLAC OY, Turku (FI)

(72) Inventors: Joona-Pekko Kakko, Turku (FI); Henna Päkkilä, Turku (FI); Teemu Korpimäki, Turku (FI); Mikko Sairanen, Turku (FI); Ville Veikkolainen, Turku (FI)

(73) Assignee: WALLAC OY, Turku (FI)

( * ) Notice: Subject to any disclaimer, the term of this patent is extended or adjusted under 35 U.S.C. 154(b) by 66 days.

(21) Appl. No.: 17/590,325

(22) Filed: Feb. 1, 2022

(65) Prior Publication Data

US 2022/0244277 A1 Aug. 4, 2022

Related U.S. Application Data

(60) Provisional application No. 63/144,195, filed on Feb. 1, 2021.

(51) Int. Cl.
*G01N 33/543* (2006.01)
*C12N 5/073* (2010.01)
(Continued)

(52) U.S. Cl.
CPC ............ *G01N 33/76* (2013.01); *C12N 5/0604* (2013.01); *G01N 33/5005* (2013.01); *G01N 33/54388* (2021.08)

(58) Field of Classification Search
CPC ............... G01N 33/76; G01N 33/5005; G01N 33/54388; C12N 5/0604; B01L 2300/0825
See application file for complete search history.

(56) References Cited

U.S. PATENT DOCUMENTS

| | | | |
|---|---|---|---|
| 8,721,990 B2 * | 5/2014 | Raj ................. | G01N 33/54388 422/429 |
| 2005/0095697 A1 | 5/2005 | Bachur et al. | |

(Continued)

FOREIGN PATENT DOCUMENTS

| | | |
|---|---|---|
| WO | 2005029073 A2 | 3/2005 |
| WO | 2007056723 A2 | 5/2007 |
| WO | 2019245744 A1 | 12/2019 |

OTHER PUBLICATIONS

Li et. al., Preimplantation Genetic Screening with Spent Culture Medium/Blastocoel Fluid for in Vitro Fertilization. Sci Rep 8:9275, pp. 1-10, Jun. 18, 2018. (Year: 2018).*

(Continued)

*Primary Examiner* — Gary Counts
(74) *Attorney, Agent, or Firm* — Myers Bigel, P.A.

(57) ABSTRACT

A lateral flow test strip reader for reading an output of a lateral flow assay to determine a presence or absence of a target in a sample includes: a housing having a lateral flow test strip receptacle for receiving a lateral flow test strip therein, the lateral flow test strip receptacle defining a test region and a control region for a lateral flow test strip; a light source that generates an excitation light beam; at least one lens for optically expanding the excitation light beam in a direction across the test region and the control region such that the excitation light beam is configured to simultaneously impinge and excite both the test region and the control region; and an optical detector configured to simultaneously detect an image comprising emission signals from the test region and the control region.

20 Claims, 20 Drawing Sheets

(51) Int. Cl.
*G01N 33/50* (2006.01)
*G01N 33/76* (2006.01)

(56) References Cited

U.S. PATENT DOCUMENTS

| | | | |
|---|---|---|---|
| 2005/0243321 | A1 | 11/2005 | Cohen et al. |
| 2005/0244952 | A1* | 11/2005 | Cohen .................... G01N 21/01 |
| | | | 435/287.2 |
| 2006/0076523 | A1 | 4/2006 | Higashiisogawa et al. |
| 2009/0069200 | A1 | 3/2009 | Yu |
| 2010/0267049 | A1 | 10/2010 | Rutter et al. |
| 2012/0075626 | A1* | 3/2012 | Geva ..................... B01F 33/452 |
| | | | 356/244 |
| 2014/0273189 | A1* | 9/2014 | Ma ........................ G01J 3/0218 |
| | | | 435/287.2 |
| 2016/0282343 | A1* | 9/2016 | Jeyendran ........ G01N 33/54388 |
| 2021/0095235 | A1 | 4/2021 | Collins |
| 2021/0364512 | A1 | 11/2021 | Sarhan |
| 2021/0364536 | A1 | 11/2021 | Busa et al. |

OTHER PUBLICATIONS

Thomas p. O'Connor, SNAP Assay Technology. Topics in Companion Animal Medicine, vol. 30, Issue 4, Dec. 2015. (Year: 2015).*
Chen et al., A method for the detection of hCG B in spent embryo culture medium based on multicolor fluorescence detection from microfluidic droplets, Biomicrofluidics Apr. 14, 2020, pp. 1-7. (Year: 2020).*
He et al., Quantitative Lateral Flow Strip Sensor Using Highly Doped Upconversion Nanoparticles, Analytical Chemistry, 2018, 90, pp. 12356-12360). (Year: 2018).*
Scott et al., Noninvasive metabolomic profiling of human embryo culture media using Raman spectroscopy predicts embryonic reproductive potential: a prospective blinded pilot study, Fertility and Sterility, vol. 90, No. 1, Jul. 2008, pp. 77-83. (Year: 2008).*
International Search Report and Written Opinion corresponding to PCT/EP2022/052351; Mailed: Sep. 13, 2022 (15 pages).
International Search Report and Written Opinion corresponding to PCT/EP2022/052350; Mailed: May 10, 2022 (18 pages).
Kazakova, et al., "Serological Array-in-Well Multiplex Assay Reveals a High Rate of Respiratory Virus Infections and Reinfections in Young Children", mSphere, 5(5): e00447-19, 2019, 1-14.
Lai, et al., "An Upconversion Nanoparticle with Orthogonal Emissions Using Dual NIR Excitations for Controlled Two-Way Photoswitching", Angewandte Chemie International Edition, 53(52), 2014, 14419-14423.
Magliulo, et al., "A rapid multiplexed chemilumnescent immunoassay for the detection of *Escherichia coli* 0157:H7, *Yersinia enterocolitica*, *Samonella typhimurium*, and Listeria monocytongenes pathogen bacteria", Journal of Agricultural and Food Chemistry, American Chemical Society, 55(13), 2017, 4933-4939.
Pilavaki, et al., "Optimized Lateral Flow Immunoassay Reader for the Detection of Infectious Diseases in Developing Countries", Sensors, 17(11), 2017, 1-11.
Roda, et al., "Microtiter format for simultaneous multianalyte detection and development of a PCR-chemiluminescent enzyme for immunoassay for typing human papillomavirus DNAs", Clinical Chemistry, Oxford University Press, 48(10), 2002, 1654-1660.
International Search Report and Written Opinion for PCT/EP2022/052349, mailed Jun. 29, 2022, 19 pages.
Invitation to Pay Additional Fees for PCT/EP2022/052349 mailed May 6, 2022, 15 pages.
He, Hao, et al., "Quantitative Lateral Flow Strip Sensor Using Highly Doped Upconversion Nanoparticles", Anal. Chem. 2018, 90, 12356-12360.
Unknown, "QuickStripeTM hCG", Https://www.savyondiagnostics.com/wp-content/uploads/2017/07/QuickStripe_hCG_41110E.V02-09-2017-2.pdf, Jul. 1, 2017, 4 pages.
DRG Instruments GMBH, "HCG ELISA Instructions for Use", HCG ELISA EIA-1469, Version 10.0; Dated: Dec. 2020— Downloaded from: https://www.drg-diagnostics.de/files/eia-1469_ifu—hcg_2020-12-17_endeitesfr.pdf, 2020, (36 pages).
DRG Instruments GMBH, "PLGF ELISA Instructions for Use", PLGF ELISA EIA-4529, Version 13.0; Dated: Jul. 2017— Downloaded from: https://www.drg-diagnostics.de/files/eia-4529_ifu—plgf_2017-07-11_ende.pdf, 2017, (19 pages).

* cited by examiner

LATERAL FLOW TEST STRIP READERS, CARTRIDGES AND RELATED METHODS

FIELD

The present disclosure relates to lateral flow test strip readers, cartridges and related methods, and more particularly to lateral flow test strip readers for reading upconverting nanoparticle signals on a lateral flow test strip in a cartridge.

BACKGROUND

Upconverting nanoparticles (UCNPs) are nanoscale particles (e.g., having a diameter of 1-100 nm) that exhibit photon upconversion in which two or more incident photons of relatively low energy are absorbed and converted into one emitted photon with a higher energy than either of the incident photons. The absorption typically occurs in the infrared range, while emissions typically occur in the visible or ultraviolet regions of the electromagnetic spectrum. UCNPs are typically composed of rare-earth based lanthanide- or actinide-doped transition metals and may be used for a range of applications, including in vivo bio-imaging, bio-sensing, and nanomedicine because of their highly efficient cellular uptake and high optical penetrating power with little background noise in the deep tissue level.

Lateral flow tests utilizing UCNPs operate on similar principles as enzyme-linked immunosorbent assays (ELISA), but use a UCNP labelled antibody. That is, these tests typically include a pad in which a liquid sample flows along the surface of the pad with reactive molecules that show a visual positive or negative result on a test line as compared to a visual control line to show that the test is working. The pads are based on a series of capillary beds, such as pieces of porous paper. In order to detect the UCNP labelled antibody on the control and test lines, an excitation light of the appropriate wavelength is used to excite the UCNPs.

For example, He et al. (He, Hao, Baolei Liu, Shihui Wen, Jiayan Liao, Gungun Lin, Jiajia Zhou, and Dayong Jin. "Quantitative Lateral Flow Strip Sensor Using Highly Doped Upconversion Nanoparticles." Analytical Chemistry 90, no. 21 (Nov. 6, 2018): 12356-60.) discusses a UCNP lateral flow strip reader in which the device uses a 300 mW, 980 nm laser light source. Two hemisphere lenses are used with one to focus the excitation beam onto the strip and the other to collect the emission signal to a phone camera. To fully read the strip, Hu et al. fixes the optics and camera settings and move the strip from one side to the other at a constant speed so that the average fluorescence intensity values of the testing area, the control area, and the background area can be extracted from video analysis.

In Pilavaki et al. (Pilavaki, Evdokia, and Andreas Demosthenous. "Optimized Lateral Flow Immunoassay Reader for the Detection of Infectious Diseases in Developing Countries." Sensors (Basel, Switzerland) 17, no. 11 (Nov. 20, 2017)), colloidal gold nanoparticles conjugated with antibodies are used to provide a qualitative result. The principle of operation of the system developed is based on shining uniform light, using LEDs, in the detection pad surface of the lateral flow immunoassay (LFIA) and measuring the intensity of the reflected light from the LFIA to an array of photodiodes.

There remains a need for accurate and inexpensive readers and cartridges for UCNP lateral flow tests that are easy for users to operate.

SUMMARY

Disclosed are lateral flow test strip readers for reading an output of a lateral flow assay to determine a presence or absence of a target in a sample includes a housing having a lateral flow test strip receptacle for receiving a lateral flow test strip therein, the lateral flow test strip receptacle defining a test region and a control region for a lateral flow test strip; a light source that generates an excitation light beam; at least one lens for optically expanding the excitation light beam in a direction across the test region and the control region such that the excitation light beam is configured to simultaneously impinge and excite both the test region and the control region; and an optical detector configured to simultaneously detect an image comprising emission signals from the test region and the control region. The detected emission signals indicate a presence or absence of a target in the sample.

Also disclosed are methods for reading an output of a lateral flow assay to determine a presence or absence of a target in a sample includes impinging an excitation light beam simultaneously on a test region and a control region of a lateral flow test strip; and detecting an image comprising emission signals from the test region and the control region. The detected emission signals indicate a presence or absence of a target in the sample.

In some embodiments, the light source and the at least one lens comprise a line laser that projects a line laser beam across the test region and the control region.

In some embodiments, the at least one lens comprises a cylindrical lens, a Powell lens or a combination thereof that is configured to focus the excitation light beam into a line.

In some embodiments, the light source comprises a laser diode.

In some embodiments, the optical detector comprises a filter configured to filter the excitation light beam from the detected image.

In some embodiments, the lateral flow test strip comprises a sample pad, a conjugate pad including upconverting nanoparticles (UCNPs) conjugated to an analyte binding agent and an absorbent pad configured for fluid communication when a sample is applied.

In some embodiments, the reader includes a signal analyzer configured to analyze emission signals from the optical detector for the test region and the control region to determine an amount of a target in the sample.

In some embodiments, the reader includes a transmitter configured to transmit images from the optical detector for remote analysis.

In some embodiments, an excitation light beam including a line laser that projects a line laser beam simultaneously across the test region and the control region. An excitation light beam may be generated by focusing an excitation light source using cylindrical lens, a Powell lens or a combination thereof to focus the excitation light beam into a line.

Disclosed are cartridges for a lateral flow assay strip, the cartridge having an absorbent pad with a test region and the absorbent pad optionally comprises a control region for detecting an analyte of interest. In embodiments, the cartridge includes a housing having a pre-incubation well; a labeled conjugate in the pre-incubation well, wherein the labeled conjugate is configured to bind to the analyte of interest, when present, in a fluid sample; and a channel in the housing, the channel having a first end configured to receive a lateral flow assay strip therein and an opposing second end in communication with the pre-incubation well wherein, when the lateral flow assay strip is inserted in the first end of the channel, the channel is configured to have the lateral flow assay strip extend to the opposing second end of the channel or to a position sufficient for the lateral flow assay strip to contact a fluid sample, when present, in the pre-incubation well.

In some embodiments, the labeled conjugate comprises upconverting nanoparticle (UCNP) conjugates.

In some embodiments, the housing comprises a viewing window.

In some embodiments, the housing comprises a top surface, and the pre-incubation well comprises a bottom and sidewalls that define an opening on the top surface of the housing.

In some embodiments, the viewing window is on the top surface of the housing.

In some embodiments, the channel comprises an upper portion that is adjacent to the viewing window, and a downwardly extending portion that is fluidly connected to the pre-incubation well at the second end of the channel.

In some embodiments, the pre-incubation well and the labeled conjugate are configured so that, when a fluid sample is added to the pre-incubation well, the labeled conjugate is provided in the fluid sample and can bind to an analyte of interest in the fluid sample, if present.

In some embodiments, the channel is configured so that, when a lateral flow assay strip is inserted into the channel and a fluid sample is present in the pre-incubation well, a first portion of the lateral flow assay strip contacts the fluid sample with the labeled conjugate therein, and the fluid sample flows by capillary action through the absorbent pad to the test region and the optional control region of the lateral flow assay strip, and a signal from the labeled conjugate is detectable in the test region, if the target analyte is present, and optionally in the control region.

In some embodiments, the labeled conjugate is dried on a bottom and/or sidewall of the pre-incubation well.

In some embodiments, the labeled conjugate is in and/or on a conjugate pad that is present in the pre-incubation well.

In some embodiments, the lateral flow assay strip inserted in the first end to the second end extends through the channel and contacts a fluid sample, when present, in the pre-incubation well at the second end of the channel, wherein the fluid sample flows by capillary action through the absorbent pad of the lateral flow assay strip to produce a signal at the test region, when the analyte of interest is present, and optionally at the control region.

In some embodiments, when the lateral flow assay strip is inserted in the first end to the second of the channel, the lateral flow assay strip contacts a bottom surface of the pre-incubation well.

Also disclosed are methods of pre-incubating a fluid sample in a cartridge for a lateral flow assay strip having an absorbent pad with a test region and optionally a control region on the absorbent pad for detecting an analyte of interest, the methods comprising: providing a cartridge comprising: a housing having pre-incubation well; a labeled conjugate in the pre-incubation well, wherein the labeled conjugate is configured to bind to the analyte of interest when present in a fluid sample; and a channel in the housing having a first end configured to receive a lateral flow assay strip therein and an opposing second end in communication with the pre-incubation well. The method includes adding a fluid sample to the pre-incubation well for a time sufficient to allow for binding between the labeled conjugate and the analyte of interest, when present; and inserting a lateral flow assay strip into the first end of the channel so that the lateral flow assay strip extends through the channel and contacts a fluid sample in the pre-incubation well, wherein the fluid sample flows by capillary action through the absorbent pad of the lateral flow assay strip to produce a signal at the test region, when the analyte of interest is present, and optionally at the control region.

In some embodiments, the labeled conjugate comprises upconverting nanoparticle (UCNP) conjugates.

In some embodiments, the housing comprises a viewing window, the method comprising positioning the test region and the control region in the viewing window.

In some embodiments, the housing comprises a top surface, the pre-incubation well comprises a bottom surface and sidewalls that define an opening on the top surface, the viewing window is on the top surface of the housing, and the channel comprises an upper portion that is adjacent to the viewing window and a downwardly extending portion that is fluidly connected to the pre-incubation well at the second end of the channel.

In some embodiments, the method includes, when a fluid sample is added to the pre-incubation well, providing the labeled conjugate the fluid sample and, when the analyte of interest is present, labeled conjugate bound to the analyte of interest in the fluid sample.

Also disclosed are kits that include a lateral flow assay strip having an absorbent pad with a test region and optionally a control region on the absorbent pad for detecting an analyte of interest; and a cartridge comprising: a housing having a pre-incubation well; a labeled conjugate in the pre-incubation well, wherein the labeled conjugate is configured to bind to the analyte of interest, when present, in a fluid sample; and a channel in the housing having a first end configured to receive a lateral flow assay strip therein and an opposing second end in communication with the pre-incubation well wherein, when the lateral flow assay strip is inserted in the first end of the channel, the channel is configured to have the lateral flow assay strip extend to the opposing second end of the channel or to a position sufficient for the lateral flow assay strip to contact a fluid sample, when present, in the pre-incubation well.

Disclosed are methods of evaluating and/or monitoring function and/or viability of an embryo grown in vitro, where the methods include: contacting a lateral flow assay strip and a fluid sample comprising culture media in which the embryo was cultured, wherein the fluid sample contacts a labeled conjugate that binds to a target analyte, when present in the fluid sample, and the lateral flow assay strip comprises an absorbent pad with a test region and optionally a control region such that the fluid sample flows by capillary action through the absorbent pad to produce a signal at the test region, when the target analyte is present; and detecting a signal at the test region, wherein the signal indicates the presence of the target analyte.

In some embodiments, the methods provide a limit of detection for the target analyte (e.g., human chorionic gonadotropin (hCG)) of less than 25, 10, 1, 0.5 or 0.3 mIU/mL, optionally wherein the methods provide a limit of detection for the target analyte (e.g., human chorionic gonadotropin (hCG)) of about 0.1 or 0.2 mIU/mL to about 0.3, 0.5, or 1 mIU/mL.

In some embodiments, the methods are performed in less than 30 minutes, optionally wherein the methods are performed in about 1, 5, or 10 minute(s) to about 15, 20, 25, or 30 minutes.

In some embodiments, the culture media is media in which the embryo was cultured at day 1, 2, 3, 4, 5, 6, 7, 8, or 9 after fertilization of the embryo, optionally wherein the culture media is media in which the embryo was cultured at day 4, 5, or 6 after fertilization of the embryo.

In some embodiments, the methods include obtaining the culture media, wherein obtaining the culture media comprises taking all or a portion of media in which the embryo is cultured.

In some embodiments, obtaining the culture media comprises taking about 1, 5, 10, or 20 µL to about 30, 40, 50, 60, 70, 80, 90, or 100 µL of media in which the embryo is cultured, optionally wherein obtaining the culture media comprises taking about 1 µL to about 50 µL of media in which the embryo is cultured.

In some embodiments, the methods include contacting the lateral flow assay strip and a running buffer, optionally wherein the running buffer comprises a salt (e.g., sodium or potassium chloride) in an amount of about 250 or 500 mM to about 750 or 1000 mM.

In some embodiments, the fluid sample and/or running buffer has a pH of about 5, 5.5, 6, 6.5, or 7 to about 7.5, 8, 8.5, 9, 9.5 or 10.

In some embodiments, the methods include contacting the lateral flow assay strip and the fluid sample comprises contacting the lateral flow assay strip and the culture media and subsequently contacting the lateral flow assay strip and the running buffer.

In some embodiments, the culture media and running buffer are combined to provide a sample and contacting the lateral flow assay strip and the fluid sample comprises contacting the sample and the lateral flow assay strip.

In some embodiments, the fluid sample and labeled conjugate are contacted prior to contacting the lateral flow assay strip and the fluid sample, optionally wherein the labeled conjugate is added into the fluid sample and the fluid sample comprising the labeled conjugate is contacted to the lateral flow assay strip.

In some embodiments, the labeled conjugate is present on a portion of the lateral flow assay strip (e.g., on and/or in a conjugate pad of the lateral flow assay strip) and the fluid sample contacts the labeled conjugate via capillary action through the portion of the lateral flow assay strip.

In some embodiments, the embryo is grown and/or cultured in a cell culture container (e.g., a cell culture dish) comprising the culture media, optionally wherein the embryo is grown and/or cultured at a controlled temperature and/or in an incubator.

In some embodiments, the contacting comprises contacting a first lateral flow assay strip and a first fluid sample comprising first culture media in which the embryo was cultured and detecting a first signal at the test region, wherein the first signal indicates the presence of the target analyte in the first culture media; and the method further comprises: contacting a second lateral flow assay strip and a second fluid sample comprising second culture media in which the embryo was cultured and detecting a second signal at the test region, wherein the second signal indicates the presence of the target analyte in the second culture media, optionally wherein the first and second culture media are obtained from different days after fertilization of the embryo.

In some embodiments, the methods include comparing the first signal and the second signal.

In some embodiments, the methods include quantifying the amount of the target analyte in the first and/or second culture media.

In some embodiments, the signal indicates an amount of the target analyte in the fluid sample.

In some embodiments, the presence of the target analyte corresponds to a function and/or a predicted viability of the embryo.

In some embodiments, the methods include impinging an excitation beam on the test region, and wherein detecting the signal at the test region comprises detecting an emission signal at the test region.

In some embodiments, the labeled conjugate comprises upconverting nanoparticle (UCNP) conjugates.

In some embodiments, the target analyte is human chorionic gonadotropin (hCG), and/or placental growth factor (PlGF).

In some embodiments, the methods include determining the amount of the target analyte in the fluid sample and/or culture media.

In some embodiments, the methods include visually evaluating the morphology of the embryo.

In some embodiments, the labeled conjugate comprises an upconverting nanoparticle bound (e.g., covalently or non-covalently) to an analyte binding molecule.

In some embodiments, the methods include detecting the signal at the test region comprises analyzing an emission signal in an image of the test region and determining a signal strength of the labeled conjugate at the test region.

In some embodiments, the signal strength of the labeled conjugate corresponds to a function and/or a predicted viability of the in vitro embryo.

In some embodiments, the predicted viability of the in vitro embryo is based on an empirically-based model of actual clinical experience.

In some embodiments, the methods include adding the culture media to a pre-incubation well for a time sufficient to allow for binding of the labeled conjugate and the target analyte, when present, before contacting the fluid sample and the lateral flow assay strip.

In some embodiments, the labeled conjugate is in and/or on a conjugate pad in the pre-incubation well.

Also disclosed are lateral flow assay test strips for predicting viability of an in vitro embryo, the lateral flow assay test strips include an absorbent pad with a test region and optionally a control region such that a fluid sample flows by capillary action through the absorbent pad to produce a signal at the test region, when a target analyte is present; wherein a signal at the test region indicates presence and/or an amount of the target analyte to predict viability of the in vitro embryo.

In some embodiments, when the fluid sample contacts a labeled conjugate that binds to the target analyte, the test region is configured to immobilize the target analyte and the labeled conjugate produces an emission signal in response to an excitation light such that an intensity of the emission signal from the test region indicates an amount of the target analyte in the fluid sample that corresponds to a predicted viability of the in vitro embryo.

In some embodiments, the target analyte is human chorionic gonadotropin (hCG).

In some embodiments, the target analyte is placental growth factor (PFG).

In some embodiments, the test strip comprises a sample pad for receiving the sample fluid.

Also disclosed are methods of predicting viability of an in vitro embryo, the methods comprising determining an amount of a target analyte in a fluid sample, the fluid sample comprising culture media in which the in vitro embryo was cultured using a lateral flow assay test strip.

In some embodiments, the methods include contacting the fluid sample with a labeled conjugate that binds to the target analyte, the labeled conjugate comprises an upconverting nanoparticle bound to an analyte binding molecule.

In some embodiments, the methods include impinging an excitation beam on a test region and optionally a control region of the lateral flow assay test strip, and analyzing an emission signal for the test region and optionally the control region to determine a signal strength of the labeled conjugate, the signal strength of the test region corresponding to an amount of the target analyte.

In some embodiments, the target analyte is human chorionic gonadotropin (hCG).

Also disclosed are flow test strip readers for reading an output of a lateral flow assay to determine a presence or absence of a target in a sample and related methods.

In some embodiments, a lateral flow test strip reader comprises a lateral flow test strip receptacle configured to receive a lateral flow test strip having a test region and a control region; a light source configured to generate an excitation light directed to at least one of the test region and the control region of a lateral flow test strip inserted into the lateral flow test strip receptacle; an optical detector configured to detect emission signals from at least one of the test region and the control region of a lateral flow test strip inserted into the lateral flow test strip receptacle; and at least one lens configured to direct the emission signals from at least one of the test region and the control region of a lateral flow test strip inserted into the lateral flow test strip receptacle to the optical detector, the at least one lens comprising an excitation light transmission region configured to transmit the excitation light from the light source to at least one of the test region and the control region.

In some embodiments, the excitation light transmission region of the at least one lens comprises an aperture configured to allow passage of the excitation light to at least one of the test region and the control region.

In some embodiments, the at least one lens comprises a light directing region configured to direct the emission signals from at least one of the test region and the control region of a lateral flow test strip inserted into the lateral flow test strip receptacle to the optical detector.

In some embodiments, the light directing region comprises optical properties that are different from the optical properties of the excitation light transmission region of the at least one lens.

In some embodiments, the light directing region comprises a Fresnel lens.

In some embodiments, the at least one lens comprises at least a first lens having a light directing region configured to collimate the emission signals and a second lens having a light directing region configured to focus the collimated emission signals on the optical detector.

In some embodiments, the detected emission signals indicate a presence or absence of a target in the sample.

In some embodiments, excitation light comprises a laser beam.

In some embodiments, the light source comprises a laser diode.

In some embodiments, the test region comprises an elongated test line and the control region comprises an elongated control line, and the light source is configured to generate an excitation light that excites an area corresponding to at least a portion of at least one of the elongated test line and the elongated control line.

In some embodiments, the reader comprises a heater configured to control a temperature of a lateral flow test strip in the lateral flow test strip receptacle. In some embodiments, a temperature sensor is in thermal communication with the lateral flow test strip receptacle and is configured to output a temperature signal, and a temperature controller is configured to receive the temperature signal from the temperature sensor and to control the heater in response to the temperature signal.

In some embodiments, the light source is positioned off axis with respect to a direction of the emission signals received by the optical detector.

In some embodiments, an actuator is configured to move a lateral flow test strip in the lateral flow test strip receptacle from a first position to a second position. The light source is configured to direct the excitation light to one of the test region and the control region of a lateral flow test strip in the lateral flow test strip receptacle in the first position and the light source is configured to direct the excitation light to another of the test region and the control region of a lateral flow test strip in the lateral flow test strip receptacle in the second position.

In some embodiments, the optical detector comprises a filter configured to filter the excitation light beam from the detected image.

In some embodiments, the lateral flow test strip comprises a sample pad, a conjugate pad having upconverting nanoparticles (UCNPs) conjugated to an analyte binding molecule and an absorbent pad configured for fluid communication when a sample is applied.

In some embodiments, a signal analyzer is configured to analyze emission signals from the optical detector for the test region and the control region to determine an amount of a target in the sample.

In some embodiments, a transmitter is configured to transmit images from the optical detector for remote analysis.

In some embodiments, a method for reading an output of a lateral flow assay to determine a presence or absence of a target in a sample includes impinging an excitation light from a light source on at least one of a test region and a control region of a lateral flow test strip; directing emission signals from at least one of the test region and the control region with at least one lens to an optical detector, wherein the at least one lens comprises an excitation light transmission region configured to transmit the excitation light from the light source to at least one of the test region and the control region; and detecting emission signals from at least one of the test region and the control region with the optical detector, wherein the detected emission signals indicate a presence or absence of a target in the sample.

In some embodiments, the excitation light transmission region of the at least one lens comprises an aperture, and impinging an excitation light on at least one of a test region and a control region comprises passing the excitation light through the aperture.

In some embodiments, the at least one lens comprises a light directing region, and the method includes directing the emission signals from at least one of the test region and the control region of a lateral flow test strip inserted into the lateral flow test strip receptacle to the optical detector with the light directing region of the at least one lens.

In some embodiments, the method comprises positioning the light source off axis with respect to a direction of the emission signals received by the optical detector.

In some embodiments, the method comprises moving a lateral flow test strip in the lateral flow test strip receptacle from a first position to a second position. The light source may be configured to direct the excitation light to one of the test region and the control region of a lateral flow test strip in the lateral flow test strip receptacle in the first position, and the light source may be configured to direct the excitation light to another of the test region and the control region of a lateral flow test strip in the lateral flow test strip receptacle in the second position.

In some embodiments, the method comprises filtering the excitation light beam from the detected image.

In some embodiments, the method comprises analyzing emission signals from the optical detector for the test region and the control region to determine an amount of a target in the sample.

In some embodiments, the method comprises transmitting images from the optical detector for remote analysis.

In some embodiments, the method comprises heating a lateral flow test strip in the lateral flow test strip receptacle.

In some embodiments, the method comprises sensing a temperature of the lateral flow test strip receptacle and controlling the temperature sensor in response to the temperature signal.

BRIEF DESCRIPTION OF THE DRAWINGS

The accompanying drawings, which are incorporated in and constitute a part of the specification, illustrate embodiments of the disclosed methods, systems, cartridges, lateral flow assay strips, and kits, and, together with the description, serve to explain the principles thereof.

DETAILED DESCRIPTION

Figure 1:
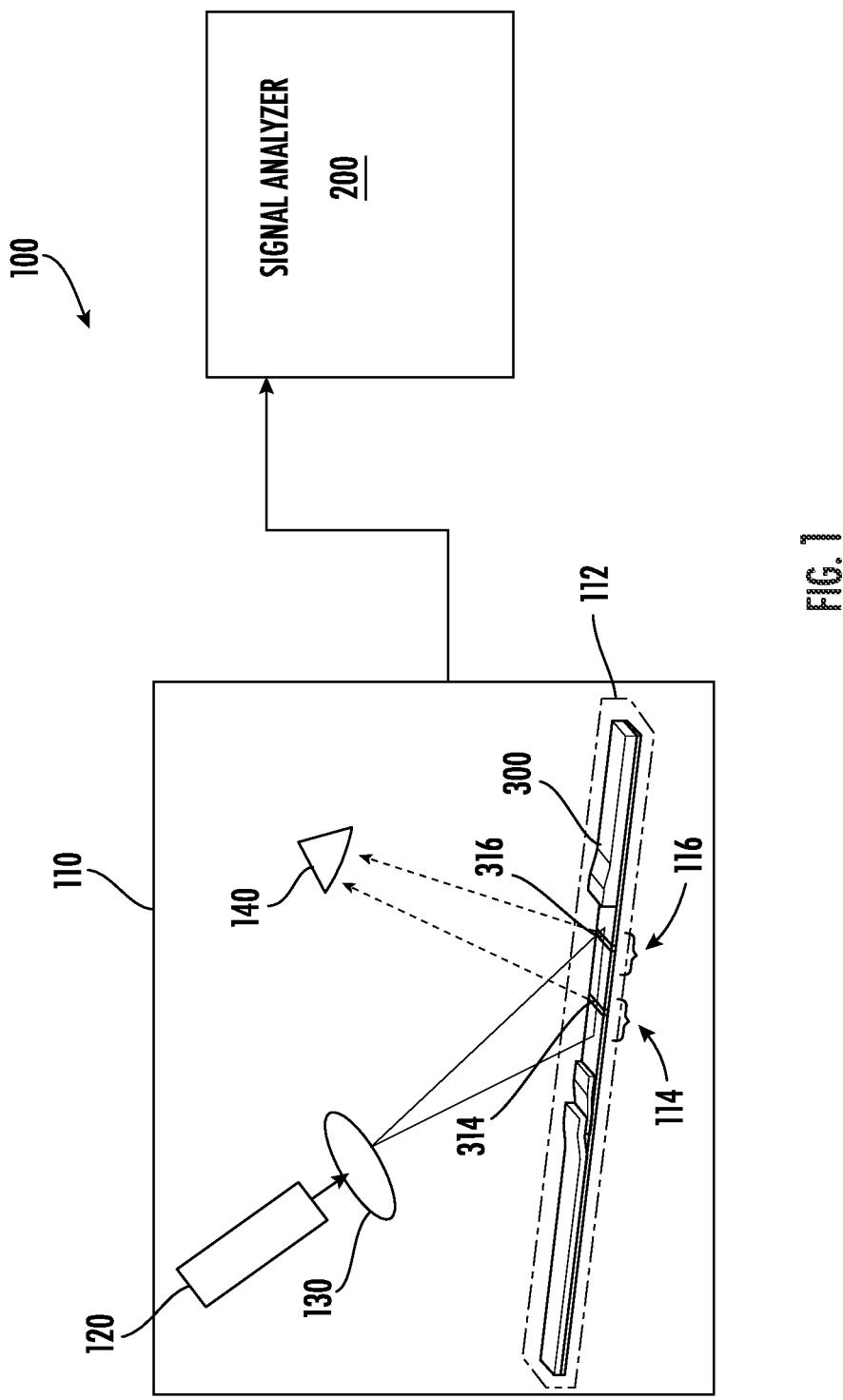
FIG. 1 is a side schematic view of a lateral flow test strip reader according to some embodiments of the present disclosure.

The present disclosure now will be described hereinafter with reference to the accompanying drawings and examples, in which embodiments are shown. The disclosed methods, systems, cartridges, lateral flow assay strips, and kits may, however, be embodied in many different forms and should not be construed as limited to the embodiments set forth herein. Rather, these embodiments are provided so that this disclosure will be thorough and complete, and will fully convey the scope of the disclosed methods, systems, cartridges, lateral flow assay strips, and kits to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, operations, elements, and/or components, but do not preclude the presence or addition of one or more other features, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. Any disclosed sequence of operations is not limited to the order presented in the disclosure, including the claims or figures, unless specifically indicated otherwise.

A lateral flow test strip may comprise an absorbent pad configured for fluid communication when a sample (e.g., a sample fluid) is contacted to the absorbent pad, a test region (e.g., a test line) and optionally a control region (e.g., control line). One or more test regions (e.g., 1, 2, 3, 4, 5, or more) may be provided on the absorbent pad and the one or more test regions may be configured to bind the same or a different target analyte. In some embodiments, a lateral flow test strip comprises a sample pad, optionally a conjugate pad including an analyte or target binding agent that comprises a signaling agent, an absorbent pad configured for fluid communication when a sample is contacted to the lateral flow test strip (e.g., contacted to the sample pad and/or absorbent pad), a test region (e.g., a test line), and optionally a control region (e.g., a control line). When present, the sample pad and conjugate pad may each be configured for fluid communication. In some embodiments, the sample pad and/or conjugate pad provide, enable, and/or bring a fluid (e.g., a sample fluid) into contact with the absorbent pad such as by lateral flow of the fluid along the lateral flow test strip. The analyte binding agent may comprise a polypeptide such as an antibody or a fragment thereof or an antigen or a fragment thereof. In some embodiments, the signaling agent is attached (e.g., covalently or noncovalently) to the analyte binding agent. In some embodiments, the signaling agent is an upconverting nanoparticle. The test line and control line may each be present on and/or in the absorbent pad. The test line comprises an immobilized capture agent (e.g., a polypeptide such as an antibody or fragment thereof or an antigen or fragment thereof) that can bind the target. The control line may comprise an immobilized control agent that binds a control agent and/or the analyte binding agent. In some embodiments, the conjugate pad receives the sample from the sample pad. In some embodiments, the absorbent pad contacts and/or receives the sample. In some embodiments, upon contact of the lateral flow test strip and the sample, the sample and analyte binding agent will migrate along the absorbent pad and the analyte binding agent may bind to the target. As the sample moves along the absorbent pad, if the target is present in the sample, then the target (or target bound to an analyte binding agent) may bind to the capture agent that is immobilized at the test line and/or an analyte binding agent may bind to a target bound to the capture agent immobilized at the test line. Upon the sample and/or analyte binding agent reaching the control line, a control agent and/or analyte binding agent may bind either directly or indirectly (e.g., via another molecule) to the control agent immobilized at the control line.

In some embodiments, the signaling agent of an analyte binding agent is an upconverting nanoparticle. "Upconverting nanoparticle," "upconversion nanoparticle," and "UCNP" each as used herein refer to a nanoparticle that can or is capable of upconverting two or more incident photons into one photon that has higher energy than either of the two or more incident photons. A "nanoparticle" as used herein refers to a particle having a diameter of at least 1 nm to less than 1000 nm. In some embodiments, a UCNP has a diameter in a range of about 5, 10, 15, 20, 25, 30, 35, 40, or 45 nm to about 50, 55, 60, 65, 70, 75, 80, 85, 90, 95, 100, or 200 nm. In some embodiments, an upconverting nanoparticle can or is capable of converting near-infra-red excitation into visible and/or ultraviolet emission, optionally via a non-linear optical process. For example, an upconverting nanoparticle may absorb infrared (IR) radiation (e.g., near IR radiation) and emit visible and/or ultraviolet radiation, thereby the upconverting nanoparticle can convert a longer radiation wavelength into shorter radiation wavelength. In some embodiments, a UCNP used in a device, system, and/or method of the present disclosure is excited in the near IR region and emits a signal in the visible wavelength range.

A UCNP may comprise a rare-earth element such as a lanthanide (e.g., lanthanum, cerium, praseodymium, neodymium, promethium, samarium, europium, gadolinium, terbium, dysprosium, holmium, erbium, thulium, ytterbium, and/or lutetium) and/or an actinide (e.g., actinium, thorium, protactinium, uranium, *neptunium*, plutonium, americium, curium, berkelium, californium, einsteinium, fermium, mendelevium, nobelium, and/or lawrencium). A rare-earth element may be present in a UCNP in an amount of about 1%, 2%, 4%, or 5% to about 10%, 20%, 30%, 40%, 50%, 60%, 70%, or 80% by weight of the UCNP. In some embodiments, a UCNP is a rare earth doped upconversion nanoparticle such as, but not limited to, a lanthanide-doped UCNP, an actinide-doped UCNP, and any combination thereof. In some embodiments, a UCNP comprises $Er^{3+}$, $Tm^{3+}$, $Y^{3+}$, $La^{3+}$, $Gd^{3+}$, $Sc^+$, $Ca^{2+}$, $Sr^{2+}$, $Ba^{2+}$, $Zr^{4+}$, $Ti^{4+}$, $NaYF_4$, $NaGdF_4$, $LiYF_4$, $YF_3$, $CaF_2$, $Gd_2O_3$, $LaF_3$, $Y_2O_3$, $ZrO_2$, $Y_2O_2S$, $La_2O_2S$, $Y_2BaZnO_5$, $Gd_2BaZnO_5$, and any combination thereof. An exemplary UCNP may be NaYF4: Yb3+, Er3+/Tm3+ with 2% Er/20% Yb, 8% Er/60% Yb, 0.5% Tm/20% Yb, or 8% Tm/60% Yb).

A UCNP may be covalently or noncovalently bound to an analyte binding agent to provide a labeled conjugate. In some embodiments, a UCNP is functionalized with a moiety that allows for and/or provides binding of a UCNP to an analyte binding molecule. Such moieties and methods of providing and/or functionalizing UCNPs with such moieties are known in the art. For example, a UCNP may comprise and/or be functionalized with a carboxyl group, an amine (e.g., a primary, secondary and/or tertiary amine) group, a hydroxyl group, thiol group, an amino group, and/or a cyano group, which may be used to bind (e.g., covalently or noncovalently) the UCNP to an analyte binding agent. In some embodiments, a UCNP comprises streptavidin and/or has a streptavidin coating, and an analyte binding agent (e.g., an antibody) is coupled to biotin and to the UCNP via the biotin. In some embodiments, a UCNP is manufactured with a hydrophobic compound and/or layer that can be used to chemically couple, such as via a —COOH group, an analyte binding agent (e.g., an antibody) to the UCNP. In some embodiments, an analyte binding agent is an antibody or a fragment thereof and a UCNP is bound to the antibody or fragment thereof, optionally via a covalent bond. In some embodiments, a UCNP comprises silica (e.g., a silica layer and/or an amorphous silica shell) that is optionally around the UCNP. In some embodiments, a UCNP comprises a polyanion such as poly(styrene sulfonate), a polycation such as poly(allylamine hydrochloride), a polyacrylic acid (PAA), a polyethylene glycol (PEG), and/or a copolymer thereof and/or any combination thereof, each of which may optionally be in the form of a coating (e.g., having a thickness of about 1 nm to about 5, 10, 15, or 20, nm) around the UCNP.

In some embodiments, using a labeled conjugate comprising a UCNP may provide advantages for an assay and/or detection. For example, a labeled conjugate comprising a UCNP may reduce or avoid non-specific binding. Thus, a non-specific binding signal may be reduced or avoided.

Lateral Flow Test Strip Reader

Figure 2:
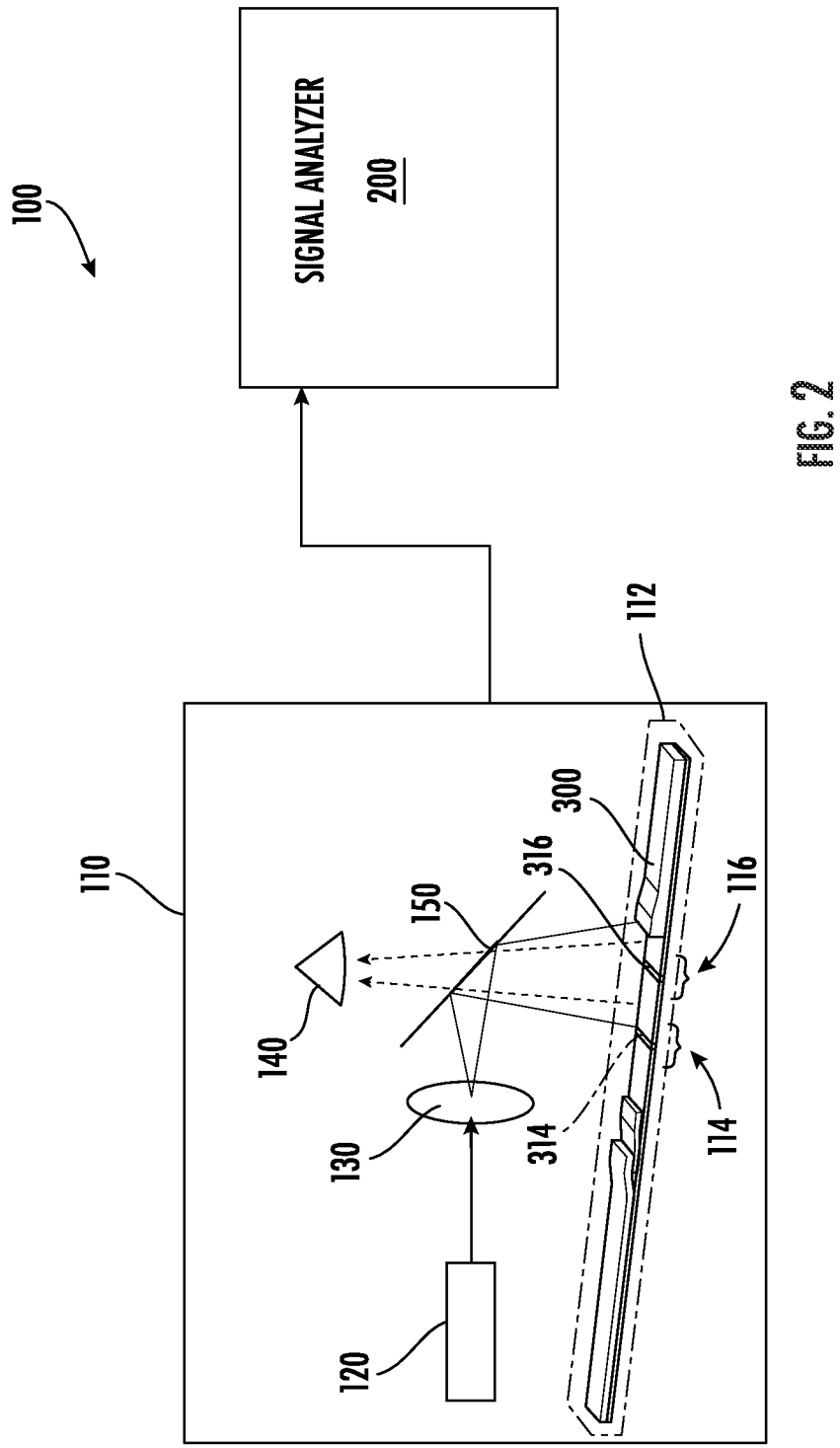
FIG. 2 is a side schematic view of a lateral flow test strip reader having a hot mirror according to some embodiments.

As illustrated in FIGS. 1-2, a lateral flow test strip reader 100 for reading an output of a lateral flow assay to determine a presence or absence of a target (e.g., an analyte) in a sample and/or to qualitatively determine an amount of a target in a sample is shown. The lateral flow test strip reader 100 includes a housing 110 having a slot or lateral flow test strip receptacle 112 for receiving a lateral flow test strip 300 therein. The lateral flow test strip 300 has a test line 314 and a control line 316, and the lateral flow test strip receptacle 112 defines a corresponding test region 114 and a control region 116. The reader 100 includes a light source 120, for example, an infrared laser, that generates an excitation light, e.g., in the form of a light beam, and at least one lens 130 for optically expanding the excitation light in a direction across the test region 114 and the control region 116 such that the excitation light is configured to simultaneously impinge and excite both the test line 314 in the test region 114 and the control line 316 in the control region 116 when the lateral flow test strip 300 is positioned in the test strip receptable 112. The reader 100 includes an optical detector or camera 140 configured to detect an image that is based on or derived from signals emitted from the test region 114 and the control region 116. In embodiments, the detection of the signals emitted from both the test region 114 and the control region 116 is simultaneous. For example, the signals may be detected in a single image.

A signal analyzer 200 receives images from the camera 140, which indicate a presence or absence of a target in the sample. In some embodiments, the brightness or amount of the emission signals corresponding to the test line 314 as compared to the control line 316 may be used for qualitative analysis, i.e., to measure how much of an analyte is in the sample. For example, known concentrations of analyte may be tested, and the resulting brightness of emission signals corresponding to the test lines at various known concentrations of analyte may be extrapolated or used to populate a lookup table so that an unknown amount of analyte in a sample may thereafter be estimated. The signal analyzer 200 may be configured as part (e.g., a module or sub-module) of the reader 100 or the reader 100 may include a transmitter configured to transmit optical data, such as data and/or images from the test region 114 and the control region 116, to a separate signal analyzer 200 for analysis.

In this configuration, a test line 314 and a control line 316 from a lateral flow test strip 300 may be impinged by the light source 120 simultaneously using an expanded light beam shaped as a line that extends over and excites both the test region 114 and control region 116 of the receptacle 112 where the test line 314 and control line 316 are received when the lateral flow test strip 300 is in position in the receptacle 112. In some embodiments, the test line 314 and the control line 316 are illuminated at the same time and without requiring moving parts or moving the light source 120 between the test region 114 and the control region 116. The lateral flow test strip receptable 112 is configured to hold the lateral flow test strip 300 in a defined orientation such that the test line 314 and control line 316 are positioned in the test region 114 and control region 116, respectively, of the receptacle 112. For example, the receptacle 112 can be a slot or other receptacle formed in the housing 110 that is sized and shaped to receive the lateral flow test strip 300 in the defined orientation such that the receptacle 112 fits snugly around the test strip 300 to hold it in the defined orientation. Any suitable receptacle may be used to fit the test strip 300 in the defined orientation for reading the test line 314 and the control line 316. For example, a notch may be included on both the test strip 300 and in the reader to a gripping mechanism or markings may be used to orient the test strip 300 or the test strip 300 may be positioned in a cartridge, as shown with respect to FIG. 3 and FIG. 6.

As shown in FIG. 2, a hot mirror 150 is optionally positioned in the reader 100 so that light from the light source 120 is reflected through the at least one lens 130 to the hot mirror 150 and reflected by the hot mirror 150 towards the sample test line 314 and control line 316. However, the light signal or upconverted photons from the sample test line 314 and control line 316 then pass through the hot mirror 150 and are detected by the optical detector 140. A "hot mirror" is a type of dielectric mirror and a dichroic filter, often employed to protect optical systems by reflecting infrared light, while allowing visible light or other wavelengths to pass.

Figure 3:
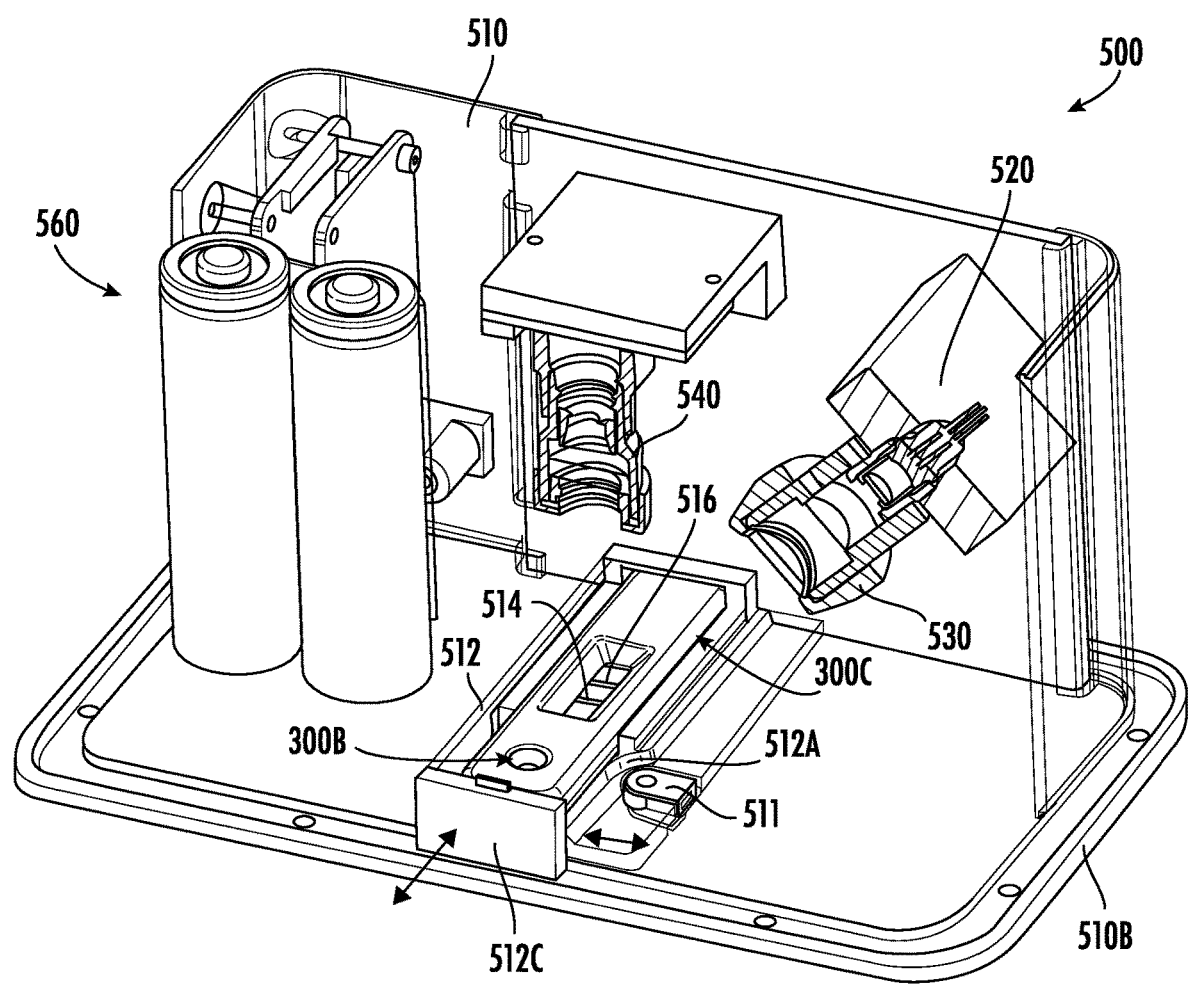
FIG. 3 is a cutaway view of a lateral flow test strip reader according to some embodiments.
Figure 6:
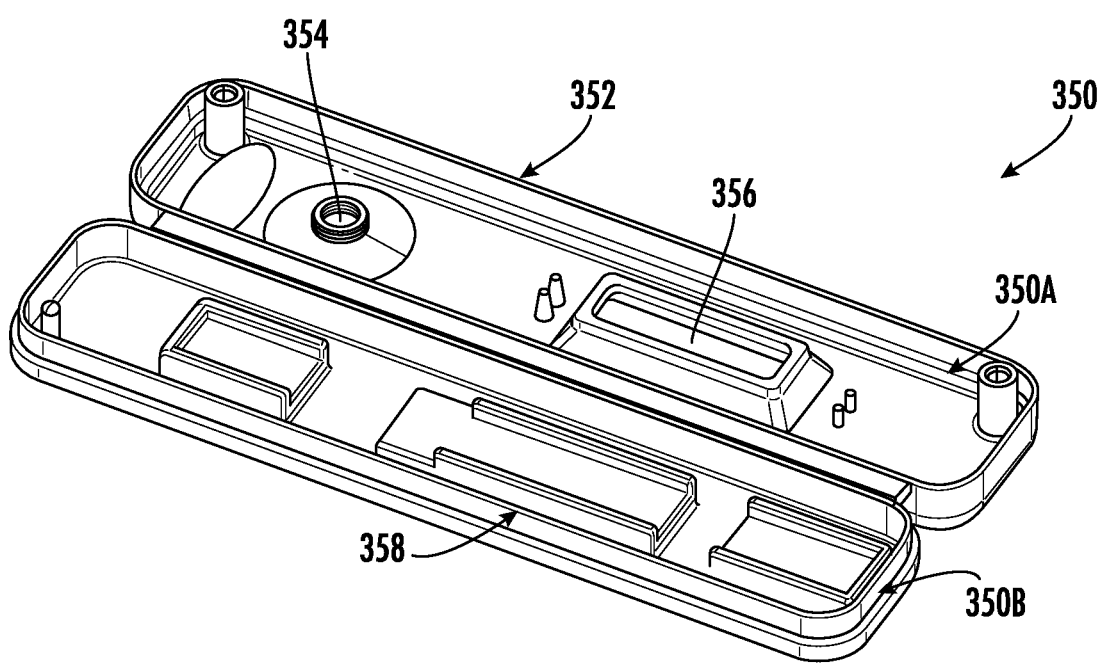
FIG. 6 is a perspective view of the test strip housing of FIG. 3.

As shown in FIG. 3, a test strip reader 500 includes a housing 510 with a base 510B, a receptacle 512, a laser light source 520 with at least one lens 530, an optical detector 540 such as a camera or an image detector, and a power source or battery 560 for providing power to the light source 520 and the optical detector 540. As illustrated, the test strip 300 is held in a test strip cartridge 300C, which as shown in FIG. 6, includes a housing 350, such as a plastic molded housing, for holding the test strip 300, and the test housing 350 also comprises a sample injection port 354 for receiving a sample on the test strip 300.

As further shown in FIG. 3, the receptacle 512 is configured to retain the test strip cartridge 300C and includes a side notch 512A, a front cover 512C and an open or transparent top. The receptacle 512 is slidably received in the housing 510 as shown in FIG. 3, for example, by pushing the cover 512C into the reader 500. The housing 510 includes a retaining member 511 that moves between an extended position toward the position of the cartridge 300C and a retracted position away from the cartridge 300C. As the housing 510 moves into the test strip reader 500, the retaining member 511 is pushed away from the cartridge 300C until the retaining member rests against the side notch 512A. The retaining member 511 is biased so that, in position, the retaining member extends into the notch 512A and holds the receptacle 512 in position. When the user pulls the cover 512C out of the reader 500, the retaining member 511 is pressed back into the depressed position so that the receptacle 512 may be removed from the reader 500.

Figure 4:
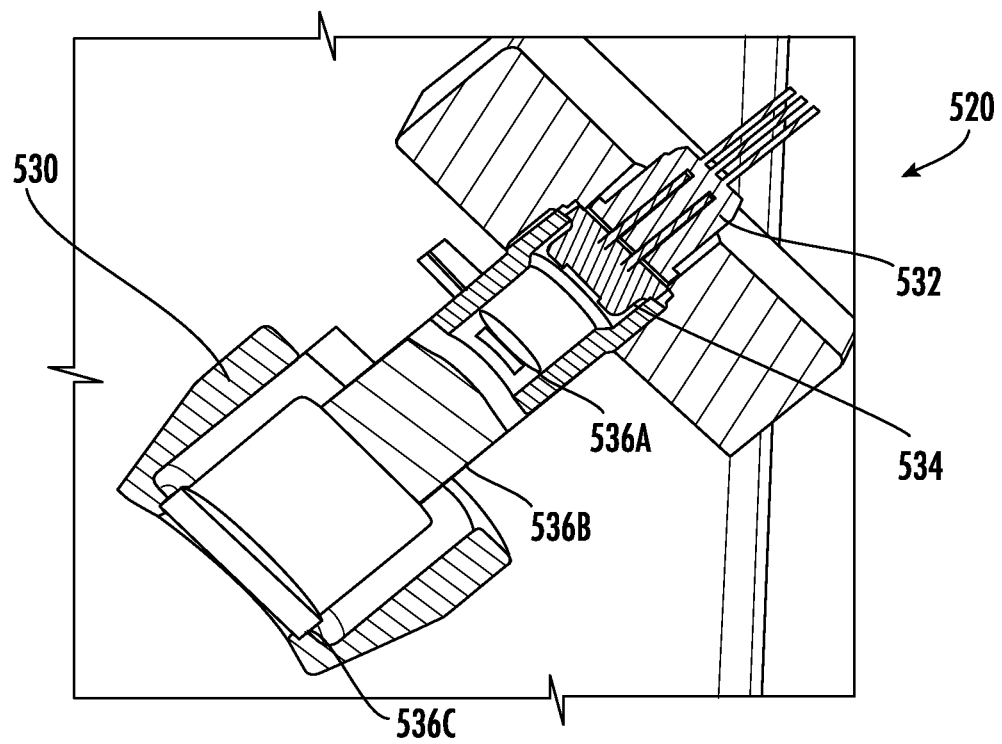
FIG. 4 is a cutaway view of a light source and optical configuration for generating a laser line of FIG. 3.

As shown in FIG. 4, a laser light source 520 includes a power supply connection or electric socket 532 a light source 534 such as a laser diode and optical lenses 530 and is positioned at an angle, such as about 45 degrees, from the test strip cartridge 300C (FIG. 3). The optical lenses 530 may be any suitable configuration of optical elements to shape the light from the laser diode 534 into an expanded projection, such as a line. As illustrated, the optical lenses 530 include a laser collimation lens 536A for collimating a laser light beam from the laser diode 534, a Powell lens 536B and a cylinder lens 536C for focusing the collimated light from the lens 536A into an expanded or line shape. The emitted light from the laser diode 534 is divergent. The emitted light is first collimated by the collimation lens 536A so that the light travels in substantially the same direction without spread or focus. For example, a f6.5 mm lens was used to collimate light from the laser diode 534 into a 3.5 mm round spot. Then, the light is spread into a fan, in this case 10 degrees (full angle), to shape the light (e.g., laser beam) into a light line (e.g., laser line) using the Powell lens 536B. Any suitable spreading angle may be used, such as between 5 and 90 degrees. Depending on the distance between the test strip 300 and the Powell lens 536B, the length of the resulting light line can be controlled. For example, the light line length may be selected to cover both the test line 314 and the control line 316 at the same time and may be dependent on the distance between the test line 314 and the control line 316. For example, the test and control lines in many test strips have roughly 6 mm separation.

Accordingly, the light/laser line may be from 7 to 10 mm long or greater or, in particular embodiments, about 8 mm long so that the laser line covers both the test line 314 and control line 316. The cylinder lens 536C is used to focus the light/laser line to the test strip 300 without affecting the length of the light/laser line. In particular embodiments, the cylinder lens 536C is f50 mm. It should be understood that any sufficiently powerful IR light source can be used for the laser diode 534. In particular embodiments, the illustrated laser diode 534 emits infrared light at about 975 nm.

For example, a Powell lens is a lens that can create a straight laser line that is generally uniform in intensity by fanning out collimated beams in one dimension. A cylindrical lens can produce diverging laser lines with a Gaussian intensity profile, i.e., a higher intensity in the center portion of the line. Although a Powell lens or a cylinder lens may be used to produce the line shaped (laser) light, in some embodiments, the Powell lens may be combined with a cylindrical lens to provide a more uniform intensity light beam as illustrated in FIG. 4.

Figure 5:
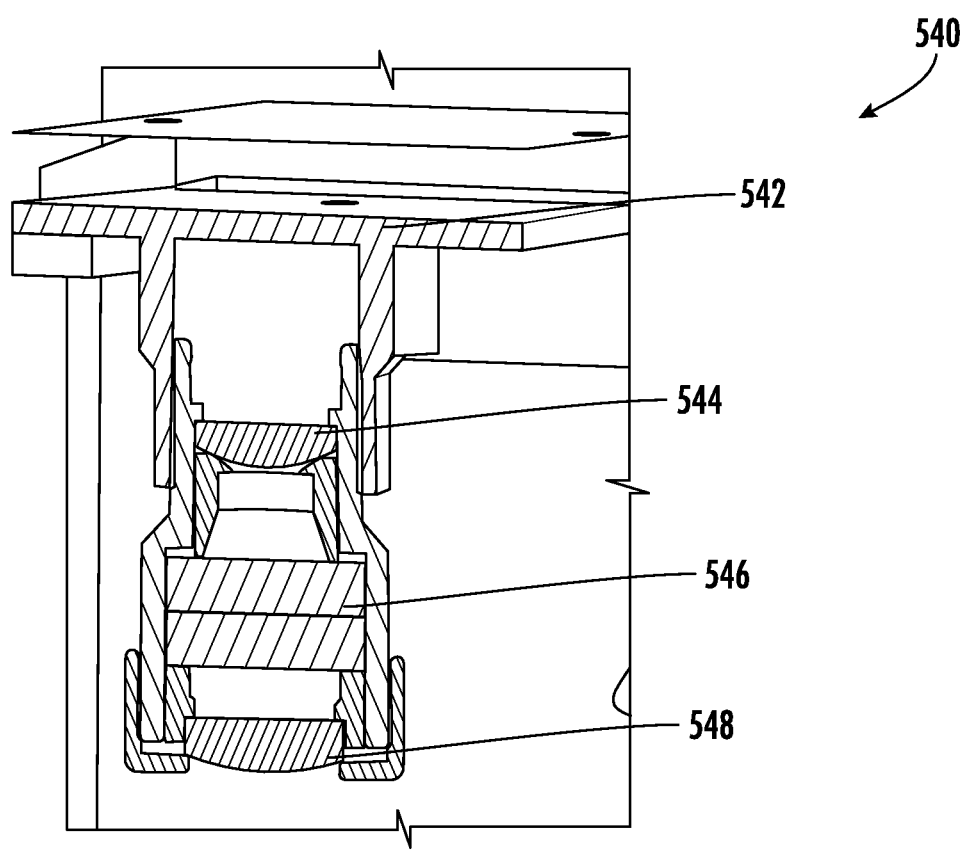
FIG. 5 is a cutaway view of an optical detector of FIG. 3.

As shown in FIG. 5, the optical detector 540 includes a chip camera 542, a focus lens 544, an IR cut filter 546 (such as a 2× IR cut filter), and a collection lens 548. In some embodiments, the optical detector 540 includes a filter, such as the IR cut filter 546, for filtering the incident laser light on the test strip 300 so that the upconverted photons from the test line 314 or control line 316 are detected by the camera 542. The optical detector 540 can then send data, for example, data associated with images of the test line 314 and control line 316, to a signal analyzer, such as the signal analyzer 200 illustrated in FIGS. 1 and 2. The signal analyzer 200 analyzes emission signals from the optical detector 140 for the test line 314 and the control line 316 to determine a presence or absence of a target in the sample. Any suitable optical detector, e.g., camera, can be used. In some embodiments, a mobile phone camera can be used. For example, the housing 510 may include a window or transparent opening to position (manually, temporarily, or otherwise) an external camera, such as a mobile phone camera, to detect images from the test line 314 and the control line 316. The (mobile phone) camera can communicate with a signal analyzer 200 or the reader 100 to allow for the scanning and analysis of the images to determine the presence or absence of a target. Such communication may be direct or indirect, wired or wireless, using a variety of communications techniques and/or protocols, e.g., wirelessly via Bluetooth.

As shown in FIG. 6, the lateral flow strip (not shown) may be placed in the housing 350. The housing 350 has a top portion 350A having an injection port 354 and a transparent window 356 for viewing the test and control lines of a test strip 300. The housing 350 has a bottom portion 350B having raised slots 358 for holding the test strip 300 in position. A notch or other cooperating piece may be included on the housing 350 and a counterpart notch into the reader 100 to hold the test strip 300 in position so that the window 356 is properly positioned in the test region 114 and the control region 116.

Figure 7:
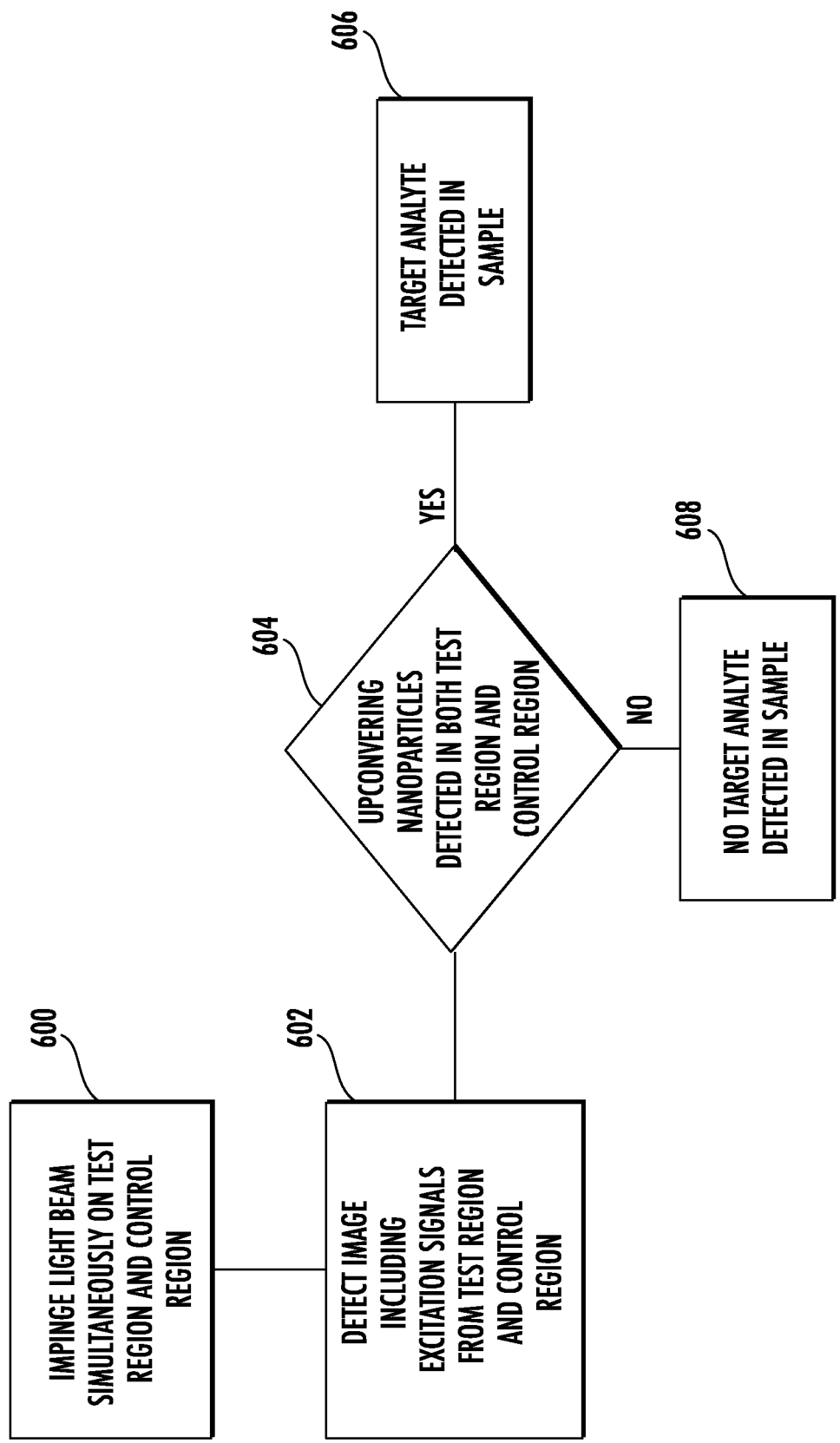
FIG. 7 is a flowchart of operations using the reader according to some embodiments.

As illustrated in FIG. 7, an excitation light beam is impinged simultaneously on the test region 114 and the control region 116 to excite UCNPs that may be present in the test line 314 and the control line 316 of the lateral flow test strip 300 (Block 600). An image of emission signals from the test line 314 in the test region 114 and the control line 316 in the control region 116 is detected by the optical detector 540 (Block 602). If the target is present in the sample, the excitation light beam (e.g., laser) will cause the UCNPs on both the test line 314 and the control line 316 to emit upconverted photons of a higher energy than the photons of the excitation beam. If the upconverted photons are detected in the image of both the test line 314 and the control line 316 at Block 604, then the presence of the target analyte is detected in the sample (Block 606). If the upconverted photons are detected in the image of the control line 316, but not the test line 314 at Block 606, then the absence of the target is detected in the sample (Block 608). In some embodiments, a threshold intensity or amount of upconverted photons triggers the detection of upconverting nanoparticles in the test region to determine the presence of the target analyte in the sample. In some embodiments, at Block 606, a relative signal of the test line 314 as compared to the control line 316 may be used to determine an amount of the target analyte in the sample, with a higher amount of signal indicating a greater amount of the target analyte in the sample.

Lateral Flow Device with Pre-Incubation Chamber

Figure 8A:
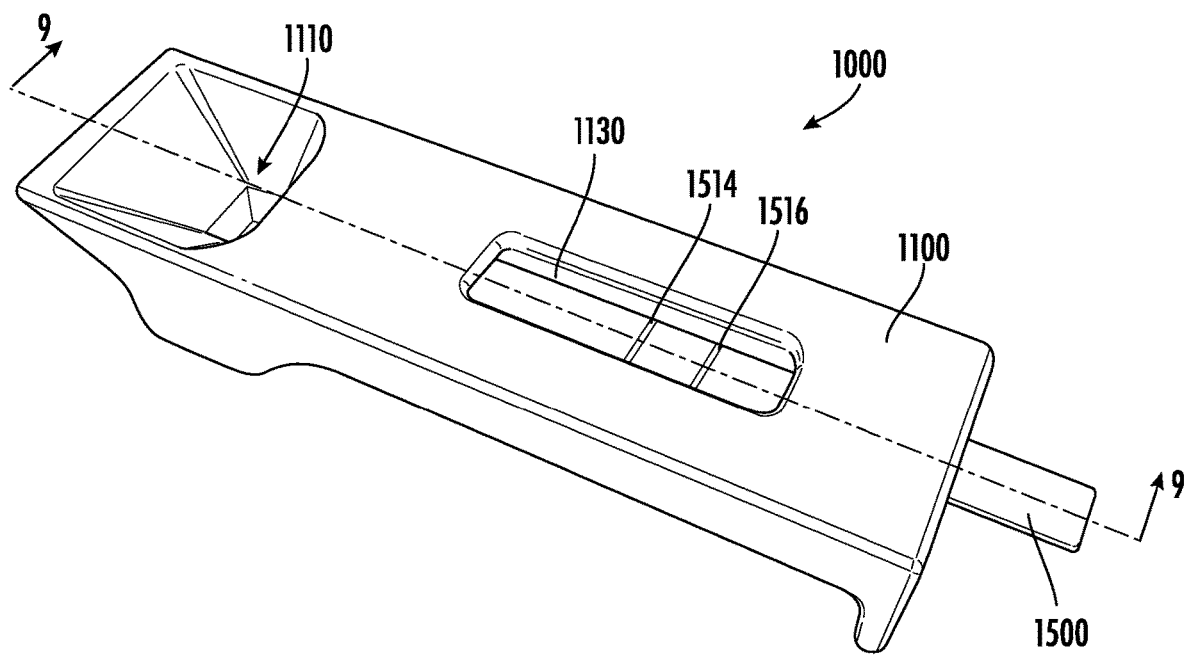
FIG. 8A is a perspective view of a lateral flow test strip cartridge according to some embodiments of the present disclosure.
Figure 9:
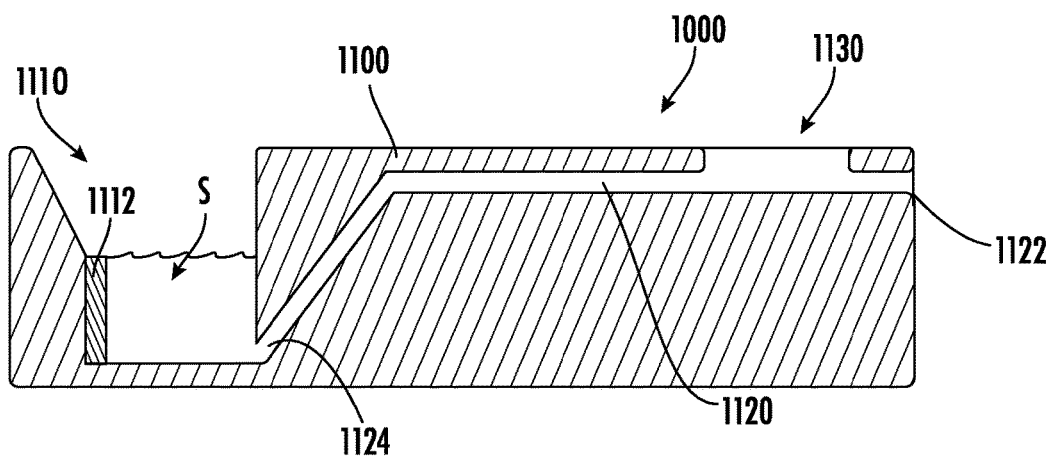
FIG. 9 is a cross sectional view of the lateral flow test strip cartridge of FIG. 8A with the lateral flow test strip removed.
Figure 10:
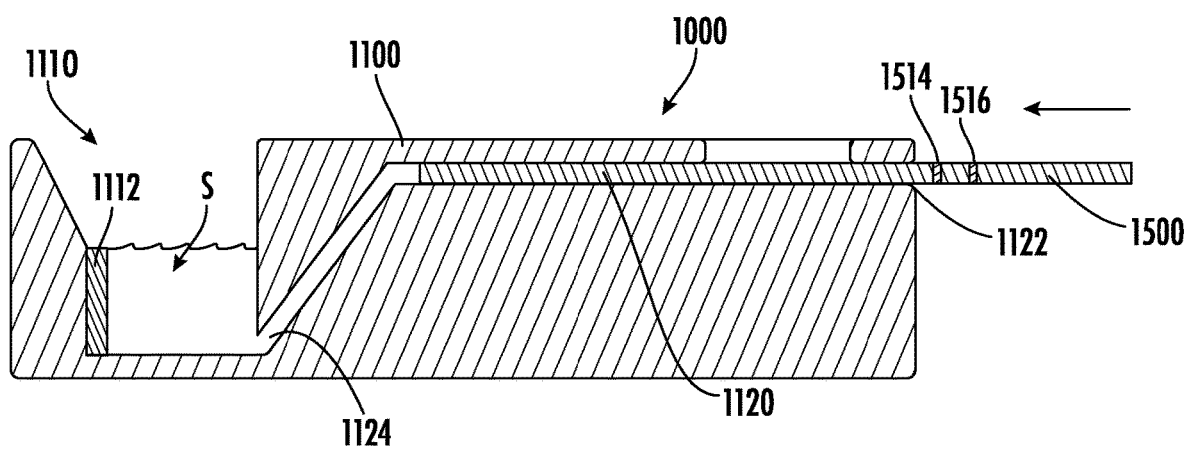
FIG. 10 is a cross sectional view of the lateral flow test strip cartridge of FIG. 8A with the lateral flow test strip partially inserted.
Figure 11:
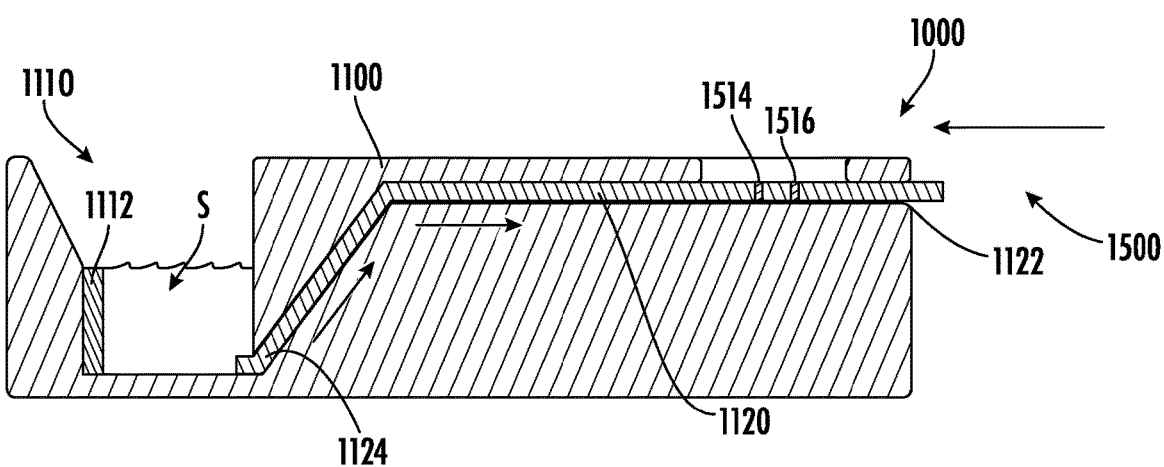
FIG. 11 is a cross sectional view of the lateral flow test strip cartridge of FIG. 8A with the lateral flow test strip fully inserted.

Another embodiment of a cartridge 1000 for a lateral flow assay is shown in FIGS. 8A and 9-11. As shown in FIGS. 9-11, the cartridge 1000 includes a housing 1100 having a pre-incubation well 1110 with a labeled conjugate 1112 residing therein. While FIGS. 9-11 illustrate the labeled conjugate 1112 on a side of the pre-incubation well 1110, other locations are possible such as on the bottom and/or on another side of the pre-incubation well 1110. In some embodiments, the labeled conjugate 1112 is a layer and/or coating on at least a portion of a side and/or bottom surface of the pre-incubation well 1110. In some embodiments, the labeled conjugate 1112 is on and/or in a conjugate pad that is positioned on at least a portion of a side and/or a bottom surface of the pre-incubation well 1110. The housing 1100 has a receiving channel 1120 that has a first end 1122 configured to receive a lateral flow assay strip 1500 therein, and an opposing second end 1124 in communication with the pre-incubation well 1110. In some embodiments, the labeled conjugate 1112 is positioned on at least a portion of a side wall of the pre-incubation well 1110 that opposes second end 1124. The pre-incubation well 1110 is configured to receive a sample fluid S therein. The labeled conjugate 1112 includes an analyte or target binding agent that comprises a signaling agent, such as a UCNP. As illustrated in FIGS. 9-11, the lateral flow assay strip 1500 is inserted in the channel first end 1122 (FIG. 10) and is pushed through the channel 1120 until it extends to the channel second end 1124 and contacts the fluid sample S in the pre-incubation well at the second end 1124 of the channel 1120 (FIG. 11). The lateral flow assay strip 1500 may be manually pushed through the channel 1120 until it contacts the fluid sample S by a user, or a mechanism for mechanically moving the lateral flow assay strip 1500 may be used, optionally using an automatic timer.

The lateral flow test strip inserted into the channel 1120 may comprise an absorbent pad 1513 configured to receive a sample (e.g., the sample fluid S), which flows, e.g., by capillary action, to a test region (e.g., a test line) 1514 and optionally a control region (e.g., control line) 1516. In some embodiments, as illustrated in FIG. 8B, the lateral flow test strip 1500 includes an optional sample pad 1510, an optional conjugate pad 1512 that may include another analyte or target binding agent that has a signaling agent (which may include a UCNP), an absorbent pad 1513 configured for fluid communication when a sample is applied to the sample pad 1510, a test line 1514 and optionally a control line 1516 on the absorbent pad 1513, and optionally a waste region or wick 1518. In some embodiments, when the lateral flow assay strip 1500 extends to the second end 1124 of the channel 1120, the sample pad 1510 is present in the second end 1124. In some embodiments, when the lateral flow assay strip 1500 is inserted in the first end 1122 of the channel 1120, the channel 1200 is configured to have the lateral flow assay strip 1500 extend to the opposing second end 1124 of the channel 1120 or to a position sufficient for the lateral flow assay strip 1500 to contact the fluid sample S, when present, in the pre-incubation well 1110 such that, in some embodiments, the lateral flow assay strip 1500 contacts a bottom surface of the pre-incubation well 1110.

In this configuration and as shown, in particular, in FIGS. 9-11, the fluid sample S may be added to the pre-incubation well 1110 and held for a suitable period of time prior to being contacted with (e.g., insertion of) the lateral flow test strip 1500. The sample S is a fluid that may include an analyte of interest ("target analyte"). In some embodiments, the sample S is a bodily fluid such as, but not limited to, placental fluid, cellular fluid, embryonic fluid, blood, blood components, and/or urine. In some embodiments, the sample S is an environmental sample such as, but not limited to, a water sample and/or a particulate sample provided in a fluid (e.g., a soil sample provided in water). In some embodiments, the liquid or fluid sample S may be diluted with a buffer or diluting liquid (e.g., water, saline, etc.). The labeled conjugate 1112 may be an analyte with a signaling agent, such as a UCNP, which may be dried on at least a portion of a side wall and/or a bottom surface of the pre-incubation well 1110, optionally dried on a conjugate pad present on at least a portion of a side wall and/or a bottom surface of the pre-incubation well 1110. When the liquid or fluid sample S is added to the sample pre-incubation well 1110, the labeled conjugate 1112 may be eluted into the liquid or fluid sample S. For example, the labeled conjugate 1112 may be released from the side and/or bottom surface of the pre-incubation well 1110 and/or may be dissolved and/or suspended in the liquid or fluid sample S. In the liquid or fluid sample S, the labeled conjugate 1112 may bind with an analyte of interest, if present, in the liquid or fluid sample S. In some embodiments, the liquid or fluid sample S optionally includes an analyte of interest that is pre-incubated with the labeled conjugate 1112 in the preincubation well 1110 for a sufficient period of time to allow for binding of the labeled conjugate 1112 and analyte of interest.

In such embodiments, after such a period of time, the lateral flow test strip 1500 is inserted into the channel 1120 (FIG. 10) until it contacts the sample S in the pre-incubation well 1110 as shown, for example, in FIG. 11. In some embodiments, the lateral flow test strip 1500 is inserted until it reaches the end of the channel 1120 and/or the bottom of the pre-incubation well 1110. The liquid sample S flows by capillary action optionally from the sample pad 1510 to the optional conjugate pad 1512 and to the absorbent pad 1513, where binding of the analyte of interest, if present, is detected by a signal in the test line 1514. The successful flow of the fluid may be registered by a signal in the control line 1516. In particular, the signals detected at the test line 1514 and/or control line 1516 may be from the signaling agent from the labeled conjugate 1112 when the labeled conjugate 1112 binds with target analyte or the fluid flows to the control line 1516. The test line 1514 comprises an immobilized capture agent that can bind the target analyte, when present, in the sample S. The control line 1516 may comprise an immobilized control agent that binds a control agent and/or the analyte binding agent. In some embodiments, the signaling agent comprises a UCNP that converts near-infrared excitation into visible and/or ultraviolet emission. For example, the UCNP may absorb infrared (IR) radiation (e.g., near IR radiation) and emit visible and/or ultraviolet radiation, which indicates a presence of the target analyte in the sample S at the test line 1514 and optionally, the successful flow of fluid to the control line 1516. The signal may be detected by a reader, such as the readers 100, 500 described herein in FIGS. 1-7.

When a sample pad 1510 and conjugate pad 1512 are not present, a portion of the absorbent pad 1513 contacts the liquid or fluid sample S, which flows by capillary action along the absorbent pad 1513. The channel 1120 may be configured so that the lateral flow test strip 1500 can be inserted to the bottom of the well 1110 and configured to allow for the lateral flow test strip 1500 to absorb most (e.g., greater than 80%) or approximately all of the sample present in the well 1110. The well 1110 may have a volume of about 50, 100, 150, 200, or 250 µL to about 300, 350, 400, 450, or 500 µL.

In this configuration, a pre-incubation may be performed without requiring transfer of the pre-incubated sample to another container to the lateral flow test strip 1500. Therefore, pre-incubation may be performed without complex training or cumbersome operations for the user.

In some embodiments, the cartridge 1000 may be read in a reader, such as the reader 100 described in FIGS. 1-5; however, any suitable reader may be used. Accordingly, the cartridge 1000 may be sized and configured to be inserted directly into the reader 100 or the reader 100 may be modified to accommodate the size and shape of the cartridge 1000 without requiring that the lateral flow test strip 1500 be removed from the cartridge 1000 for reading the signals from the test line 1514 and the control line 1516 through the window 1130. The window 1130 may be an opening in the housing 1100 of the cartridge 1000 and may include a transparent or translucent cover, such as a glass or polymer cover.

Although the labelled conjugate 1112 is illustrated as being present on the side of the well 1110, it should be understood that the labelled conjugate 1112 may be present on any suitable portion of the well 1110 and in contact with the liquid or fluid sample S.

In some embodiments, two or more (e.g., 2, 3, 4, 5, or more) different labeled conjugates 1112 are present in the well 1110 and each is configured to bind a different target analyte. The absorbent pad 1513 may include two or more test lines 1514 that each bind and/or capture one of the two or more different labeled conjugates 1112 and/or their respective target analyte.

In some embodiments, when a conjugate pad 1512 is present, the labeled conjugate 1112 present in the well 1110 and a second labeled conjugate in the conjugate pad 1512 of the lateral flow test strip 1500 may include the same analyte binding agent or a different analyte binding agent from one another. In some embodiments, at least one labeled conjugate present either in the well 1110 or on and/or in the conjugate pad 1512 of the lateral flow test strip 1500 includes a UCNP as described herein. However, in some embodiments, the conjugate pad 1512 of the lateral flow test strip 1500 is omitted, and the specific binding occurs only between the target analyte in the sample S and the labeled conjugate 1112 in the well 1110.

As illustrated in FIGS. 9-11, the channel 1120 is positioned so that the entry end 1122 is at a top portion of the cartridge 1000, and the channel 1120 includes a portion that is adjacent to the viewing window 1130 and then extends downward to the second end 1124 to connect with a bottom portion of the well 1110. In this configuration, the test line 1514 and the control line 1516 are positioned near the top of the cartridge 1000 so that the test line 1514 and the control line 1516 are visible through the window 1130, and the sample pad 1510 or absorbent pad 1513 extends downward to the bottom of the well 1110 to contact the sample S. However, other suitable configurations may be used. In some embodiments, the lateral flow test strip 1500 is pre-loaded in the cartridge 1000 and physically separated by a barrier or wall in the channel that can be removed or opened by a user action that places the lateral flow test strip 1500 in contact with the well 1110 and the sample S.

Although the well 1110 is illustrated as having a labeled conjugate 1112 on a sidewall of the well 1110, it should be understood that the labeled conjugate may be provided in any suitable manner. For example, the labeled conjugate 1112 may be positioned on the bottom of the well 1110. The labeled conjugate 1112 may be a UCNP conjugate. In some embodiments, the labeled conjugate 1112 may be added directly to the well 1110, dried on a bottom and/or sidewall of the well 1110, added directly to the fluid sample S, and/or provided on and/or in a conjugate pad.

Any suitable assay may be used with the cartridge 1000 and pre-incubation well 1110 with a labeled conjugate 1112 described herein. In some embodiments, the cartridge 1000 is used with a placental growth factor (PGF) lateral flow assay or Human Chorionic Gonadotropin (hCG) assay. It has been found that preincubating a sample with a labeled conjugate comprising a UCNP before contacting the sample to the lateral flow test strip 1500 improves assay performance.

Lateral Flow Assay with Pre-Incubation Well Example

Up-converting nanoparticle (UCNP) conjugates were diluted in an assay buffer with 1% sucrose to a final concentration of 25 ng/L (=50 ng in 2 μL) and sonicated for 3 minutes. The 2 μL aliquot was dispensed in a prototype cartridge pre-incubation well bottom and dried at 37 degrees C. for 15 minutes.

A calibrator was diluted in 1:7 assay buffer, and 80 μL of the dilution was added to the prototype cartridge. Another 80 μL of the dilution was added to a microtiter well, followed by 2 μL of UCNP dilution.

The cartridge was incubated and the microtiter wells were incubated under slow shaking for 10 minutes.

A first lateral flow strip was placed into the microtiter well and the liquid was allowed to interact with the lateral flow strip. A second lateral flow strip was pushed into the cartridge until it contacted the bottom of the pre-incubaton well and liquid entered the strip through capillary action. Substantially all liquid was taken up by the lateral flow strip in both cases.

UCNP luminescence was scanned and four lines with 2 mm distance between the furthest lines were recorded.

Figure 12:
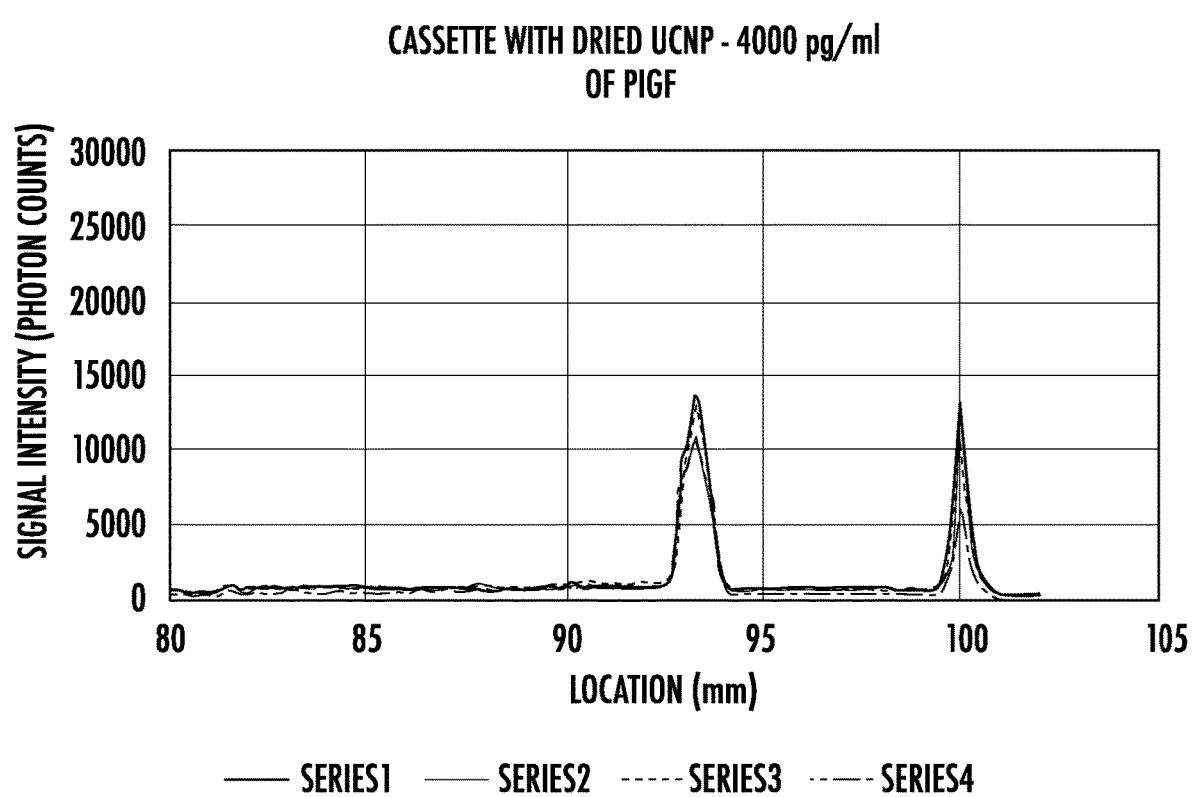
FIG. 12 is a graph of signal intensity of detected UCNP conjugates showing a test line signal peak and a control line signal peak in a cartridge according to embodiments of the present disclosure.

FIG. 12 is a graph of the signal intensity of the UCNP conjugates showing a test line signal peak and a control line signal peak in a prototype lateral flow cartridge.

Figure 13:
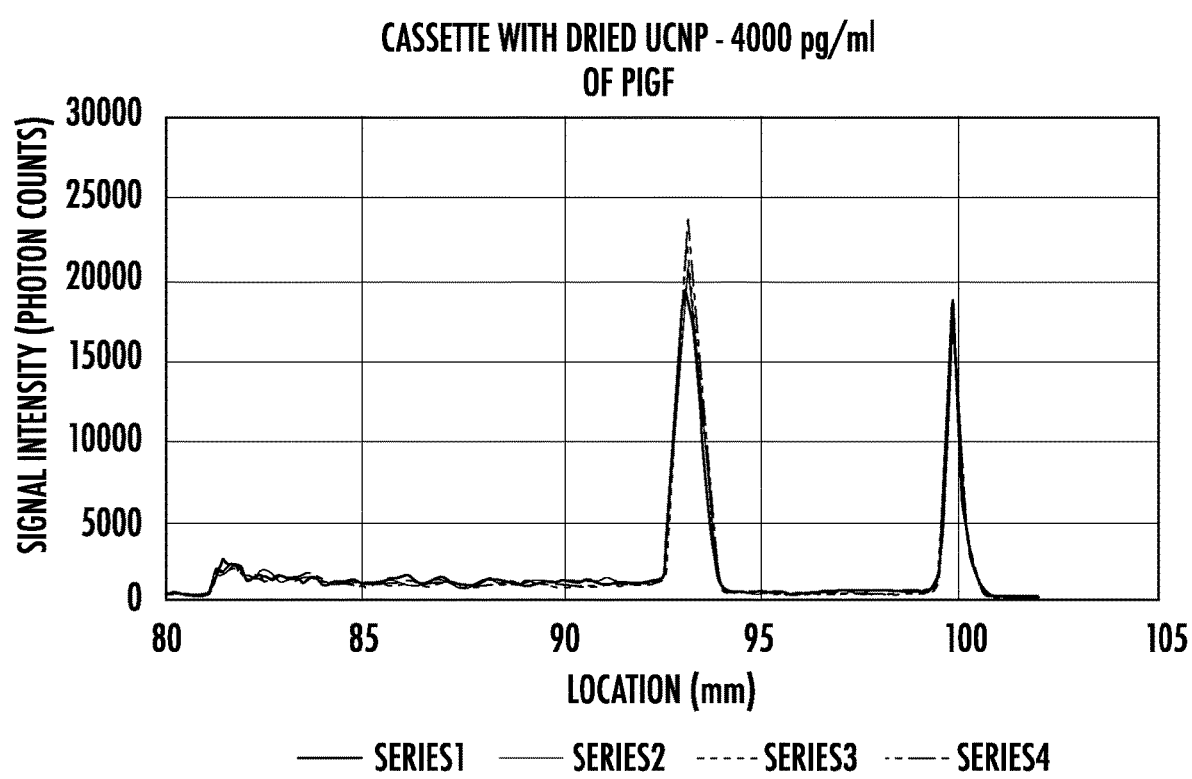
FIG. 13 is a graph of signal intensity of detected UCNP conjugates showing a test line signal peak and a control line signal peak with the sample pre-incubated in a pre-incubation well according to embodiments of the present disclosure.

FIG. 13 is a graph of the signal intensity of the UCNP conjugates showing a test line signal peak and a control line signal peak with the sample pre-incubated in a separate microtiter well.

The test results show that a pre-incubation can be easily performed using the prototype device including a dried label (UCNP conjugates) in a pre-incubation well/chamber as described. Compared to pre-incubation in a microtiter well, the sample processing is simple when using a lateral flow cartridge as disclosed herein. The microtiter well is a sample well from a standard 96 well plate. Due to drying the reagents (UCNP conjugates), the signal is slightly reduced, and the signal ratio of the test line and the control line remains unchanged. The signal ratio is simply the test signal divided by the control signal. This ratio demonstrates the test remains accurate even when the signals vary.

IVF Embryo Testing

A function and/or viability of an in vitro embryo (e.g., an in-vitro fertilization (IVF) embryo) may be evaluated and/or monitored according to some embodiments of the present disclosure. In some embodiments, a function and/or viability of an in vitro embryo may be evaluated, monitored and/or estimated by detecting the presence of a target analyte and/or determining an amount of a target analyte (e.g., a viability associated marker) in a liquid or fluid sample comprising culture media in which the in vitro embryo was cultured using the various lateral flow assays, devices and/or readers disclosed herein.

Currently, in vitro embryos are evaluated morphologically by visual inspection to evaluate function and/or viability of the in vitro embryo such as by monitoring cell division and/or counting the number of cells in an embryo. It was discovered by the inventors of the present application that lateral flow technology using UCNP detection labels as described herein can be used evaluate the function and/or viability of in vitro embryos such as IVF embryos. In some embodiments, an in vitro embryo is grown on and/or in a cell culture container (e.g., a cell culture dish), optionally non-invasively. In some embodiments, the in vitro embryo is grown and/or cultured at a controlled temperature and/or in an incubator.

According to some embodiments, a method of evaluating and/or monitoring function and/or viability of an embryo grown in vitro may comprise contacting a lateral flow assay strip and a fluid sample comprising culture media in which the embryo was cultured, wherein the fluid sample contacts a labeled conjugate that binds to a target analyte, when present in the fluid sample, and the lateral flow assay strip comprises an absorbent pad with a test region and optionally a control region such that the fluid sample flows by capillary action through the absorbent pad to produce a signal at the test region, when the target analyte is present; and detecting a signal at the test region, wherein the signal indicates the presence of the target analyte. In particular, the signals may be detected in a lateral flow assay strip at the test line and/or control line from a signaling agent from a labeled conjugate when the labeled conjugate binds with the target analyte (e.g., a viability associated marker). The test line comprises an immobilized capture agent that can bind the target analyte, when present, in the sample, and the control line comprises an immobilized control agent that binds a control agent and/or the analyte binding agent. In some embodiments, the signaling agent comprises a UCNP that converts near-infra-red excitation into visible and/or ultraviolet emission. A UCNP reader causes the UCNP to absorb infrared (IR) radiation (e.g., near IR radiation) and emit visible and/or ultraviolet radiation, which indicates a presence of the target analyte in the sample at the test line and optionally, the successful flow of fluid to the control line. The signal may be detected by a reader, such as the readers 100, 500 described herein in FIGS. 1-7.

In some embodiments, the method provides a limit of detection for the target analyte of less than 25 mIU/mL, such as less than 20, 15, 10, 5, 1, 0.5 or 0.3 mIU/mL. In some embodiments, the method provides a limit of detection for the target analyte of about 0.1 or 0.2 mIU/mL to about 0.3, 0.5, or 1 mIU/mL. The fluid sample may be or comprise culture media in which the in vitro embryo was cultured (e.g., grown). Typically, after fertilization of an embryo in vitro, the embryo is cultured in culture media for a given time period and the culture media may be changed one or more times (e.g., 2, 3, 4, or more times) during this given time period. For example, the day the in vitro embryo is fertilized is day 0, and the in vitro embryo may be cultured for 1, 2, 3, 4, 5, 6, 7, 8, 9, or more days after fertilization (i.e., day 1, 2, 3, 4, 5, 6, 7, 8, 9, etc. after fertilization). In some embodiments, the culture media is changed every day or every two, three, or more days. In some embodiments, all or a portion of the fluid sample comprises culture media from day 1, 2, 3, 4, 5, 6, 7, 8, or 9 after fertilization of the in vitro embryo. In some embodiments, the fluid sample comprises culture media in which the embryo was cultured at day 4, 5, or 6 after fertilization. The fluid sample may comprise all or a portion of the culture media in which the in vitro embryo was grown. In some embodiments, the fluid sample comprises and/or is about 1, 5, 10, or 20 µL to about 30, 40, 50, 60, 70, 80, 90, or 100 µL of culture media in which the embryo was cultured, optionally on a particular day (e.g., at day 4, 5, or 6 after fertilization). In some embodiments, the fluid sample comprises and/or is about 1 µL to about 50 µL of culture media in which the embryo was cultured, optionally on a particular day (e.g., at day 4, 5, or 6 after fertilization). One or more target analytes may be present in the fluid sample. A target analyte may be secreted by an in vitro embryo into culture media in which the embryo is present and detected in a method as described herein.

A running buffer may be used in some embodiments. The running buffer may be one known to those of skill in the art such as for use in a lateral flow assay. In some embodiments, the running buffer comprises a salt (e.g., sodium or potassium chloride) in an amount of about 250 or 500 mM to about 750 or 1000 mM. The fluid sample and/or running buffer may have a pH of about 5, 5.5, 6, 6.5, or 7 to about 7.5, 8, 8.5, 9, 9.5 or 10.

In some embodiments, a fluid sample and labeled conjugate may be contacted (e.g., combined and/or mixed together) prior to contacting a lateral flow assay strip and the fluid sample. The fluid sample and labeled conjugate may be pre-incubated for a period of time before contacting with the lateral flow assay strip, optionally as described herein. The labeled conjugate may be added into the fluid sample and the fluid sample comprising the labeled conjugate may then be contacted to the lateral flow assay strip. In some embodiments, the lateral flow assay strip and the fluid sample are first contacted such that a portion of the lateral flow assay strip absorbs the fluid sample and subsequently a running buffer is contacted to the lateral flow assay strip. The running buffer may be contacted to the lateral flow assay strip after the lateral flow assay strip has almost (e.g., 90% or more is absorbed) or entirely absorbed the fluid sample, which may help reduce or eliminate background signal. In some embodiments, culture media and a running buffer are combined to provide a fluid sample and such (combined) fluid sample is contacted to the lateral flow assay strip. In some embodiments, a labeled conjugate may be present on a portion of the lateral flow assay strip (e.g., on and/or in a conjugate pad of the lateral flow assay strip) and the fluid sample contacts the labeled conjugate via capillary action through the portion of the lateral flow assay strip.

The fluid sample thus comprises a labeled conjugate that binds to a target analyte, when present. The lateral flow assay strip may be a lateral flow assay strip as described herein and includes an absorbent pad with a test region and optionally a control region such that the fluid sample flows by capillary action through the absorbent pad to produce a signal at the test region, when the target analyte is present, and optionally at the control region. In some embodiments, the lateral flow assay strip may include a sample pad for receiving the fluid sample and the fluid sample flows by capillary action through sample pad to the absorbent pad. The signal at the test region indicates the presence of the target analyte and/or optionally indicates the amount of the target analyte in the fluid sample. The presence or absence of the target analyte may correspond to a function and/or a predicted viability of the embryo.

An excitation beam may be impinged on the test region and optionally the control region. The excitation beam may be impinged on the test region and optionally the control region simultaneously as described herein with respect to the reader 100 in FIGS. 1-2. However, any suitable reader may be used, including readers that separately impinge an excitation light on one or more test region(s) and optionally the control region at different times. In some embodiments, at least one image comprising an emission signal from the test region and the control region may be detected, and the detected emission signal may indicate an amount of the target analyte in the fluid sample that corresponds to a predicted viability of the in vitro embryo.

A method of the present disclosure may comprise evaluating and/or monitoring function and/or viability of an embryo cultured in vitro at two or more different times after fertilization of the embryo. For example, the method may comprise contacting a first lateral flow assay strip and a first fluid sample comprising first culture media in which the embryo was cultured, and detecting a first signal at the test region, wherein the first signal indicates the presence of the target analyte in the first culture media; and, contacting a second lateral flow assay strip and a second fluid sample comprising second culture media in which the embryo was cultured, and detecting a second signal at the test region, wherein the second signal indicates the presence of the target analyte in the second culture media, wherein the first and second culture media are obtained from different days after fertilization (e.g., "day 0") of the embryo. The first culture media may be culture media in which the embryo was grown on day 4 after fertilization and the second culture media may be culture media in which the embryo was grown on day 6 after fertilization. In some embodiments, the first and second signals may be compared. In some embodiments, the first and second signals may be quantified to determine the amount of the target analyte in the first culture media and/or second culture media.

A method of the present disclosure may be performed in less than 30 minutes. In some embodiments, the method is performed in about 1, 5, or 10 minute(s) to about 15, 20, 25, or 30 minutes. For example, the time from contacting a fluid sample and a labeled conjugate and/or a lateral flow assay strip to the time of detecting a signal at a test region and/or control region may be about 1, 5, or 10 minute(s) to about 15, 20, 25, or 30 minutes.

In some embodiments, the target analyte is one or both of human chorionic gonadotropin (hCG) and placental growth factor (PlGF).

In some embodiments, the labeled conjugate comprises an upconverting nanoparticle conjugated (e.g., bound covalently and/or noncovalently) to an analyte binding molecule. An emission signal in an image for a test region and optionally the control region may be analyzed to determine a signal strength of the labeled conjugate, such as the upconverting nanoparticle. The signal strength may correspond to an amount of the target analyte in the sample. The signal strength of the labeled conjugate may also correspond to a function and/or predicted viability of the in vitro embryo. A relative signal from a test line as compared to the signal from a control line may be used as a measurement of signal strength to determine an amount of the target analyte in the sample fluid with a higher amount of signal indicating a greater amount of target analyte in the sample.

A function and/or predicted viability of an in vitro embryo may be based on an empirically-based model of actual clinical experience. In some embodiments, the empirically-based model of actual clinical experience may include tests in which the concentration of the target analyte is known. The concentration of the target analyte in a sample with an unknown concentration may be determined based on a mathematical model, such as a linear regression model. In some embodiments, the empirically-based model of actual clinical experience may include viability measurements or other data based on the clinically-observed viability of embryos with a known concentration of the target analyte.

Figure 8B:
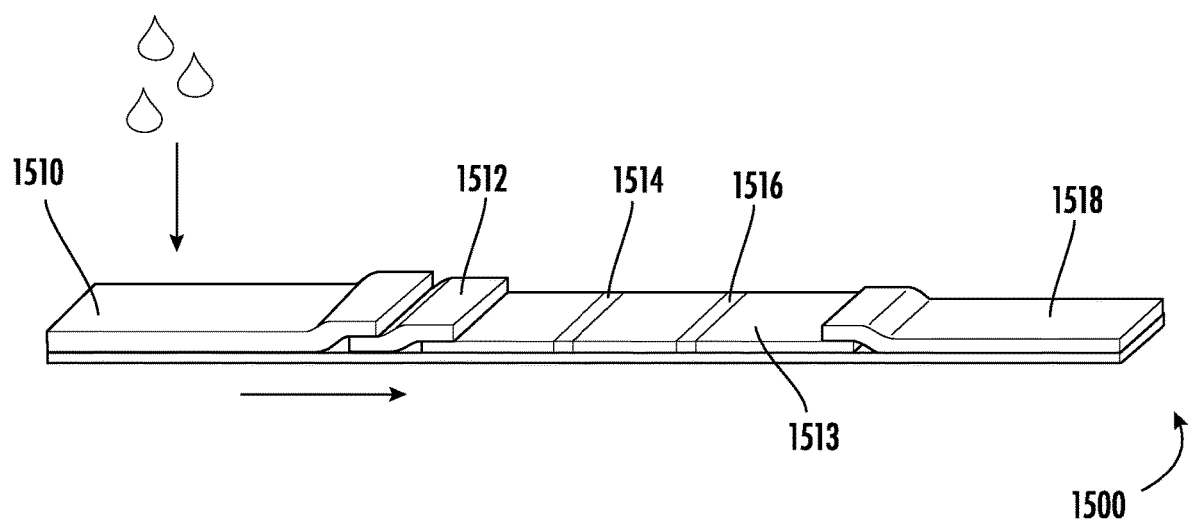
FIG. 8B is a perspective view of the lateral flow test strip from the cartridge of FIG. 8A.

In some embodiments, the fluid sample may be added to a pre-incubation well for a time sufficient to allow for binding between the labeled conjugate and the target analyte, when present, before adding the fluid sample to the lateral flow assay strip as described with respect to the lateral test flow cartridge of FIGS. 8A-8B. In some embodiments, the labeled conjugate is in and/or on a conjugate pad in the pre-incubation well. However, any suitable lateral flow test strip may be used, including a lateral flow test strip in which pre-incubation is omitted.

Accordingly, in some embodiments, a signal intensity of a test region of a lateral flow assay test strip may indicate an amount of the target analyte to thereby predict a function and/or viability of an in vitro embryo. When the fluid sample contacts a labeled conjugate that binds to the target analyte, the test region is configured to immobilize the target analyte and the labeled conjugate produces an emission signal in response to an excitation light, and an intensity of the emission signal from the test region may indicate an amount of the target analyte in the fluid sample that corresponds to a function and/or predicted viability of the in vitro embryo.

Therefore, a function and/or viability of an in vitro embryo may be determined using a lateral flow assay test strip. In some embodiments, the method further comprises visually evaluating the morphology of the embryo such as visually evaluating cell division of the embryo and/or the number of cells in the embryo. The visual evaluation may be performed using microscopy. The morphological information may be compared to a signal obtained from a test region of a lateral flow assay test strip to evaluate and/or determine a function, stage, and/or viability of the embryo.

Non-limiting examples according to embodiments of the present disclosure will now be discussed.

EXAMPLE

Lateral flow technology using UCNP detection labels was used to evaluate IVF embryos grown on a culture dish non-invasively. Currently embryos are evaluated morphologically, and there is no equivalent assay. A UCNP based lateral flow assay was used to measure Human Chorionic Gonadotropin (hCG) hormone in culture medium to assess IVF embryo viability and was found to be highly sensitive compared to conventional methods.

Figure 14:
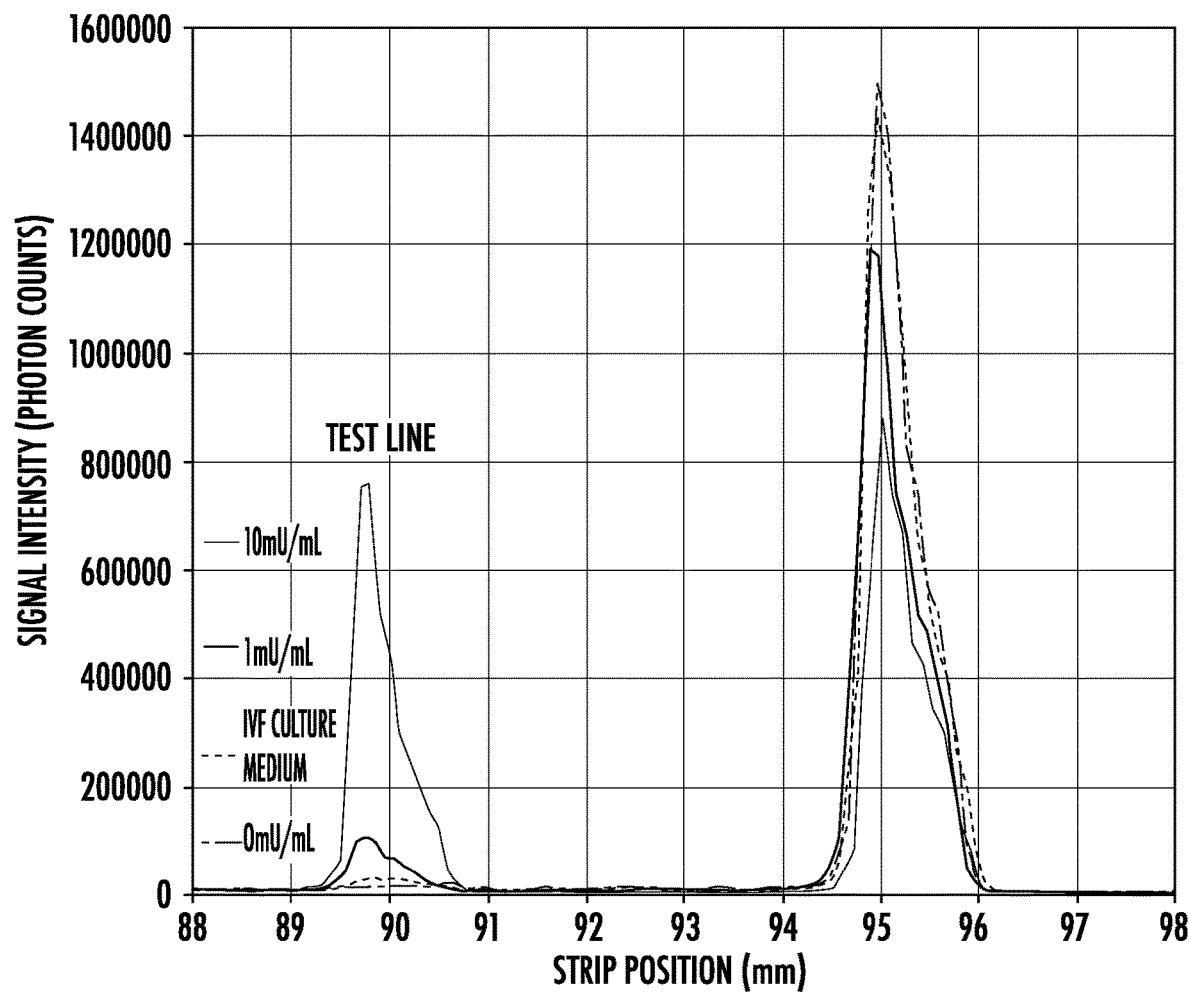
FIG. 14 is a graph illustrating the signal intensity of a test line and control line for a lateral flow dip stick for hCG in a culture medium for qualitative analysis according to some embodiments.

FIG. 14 is a graph of the intensity of the test line and the control line at various known concentrations of hCG. Embryos grown on a plate can be tested in addition to visual inspection to assess functional capacity. The results were available in 20 minutes at a sensitivity as low as 0.1 mIU/mL (sub-nmol). In dissociation-enhanced lanthanide fluorescence immunoassays (DELFIA), the concentration sensitivity is typically 0.3-0.5 mIU/mL, and standard pregnancy tests have a limit of detection around 25-50 mIU/mL. The intensity of the test line at the various known concentrations of hCG may be extrapolated to estimate the quantity of hCG in a sample with an unknown concentration of hCG.

Lateral Flow Test Strip Reader

Figure 15:
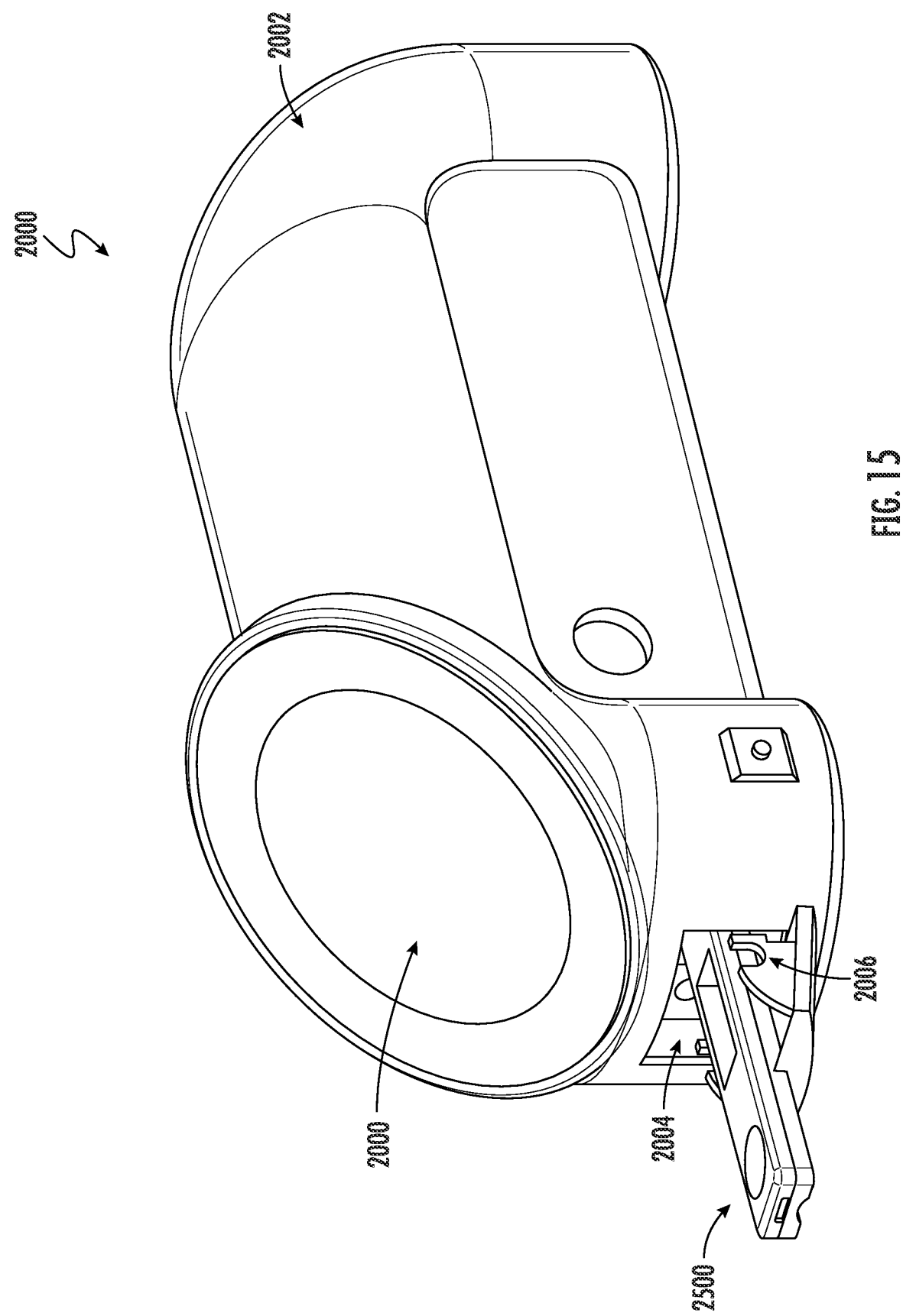
FIG. 15 is a perspective view of a lateral flow test strip reader according to some embodiments of the present disclosure.
Figure 20:
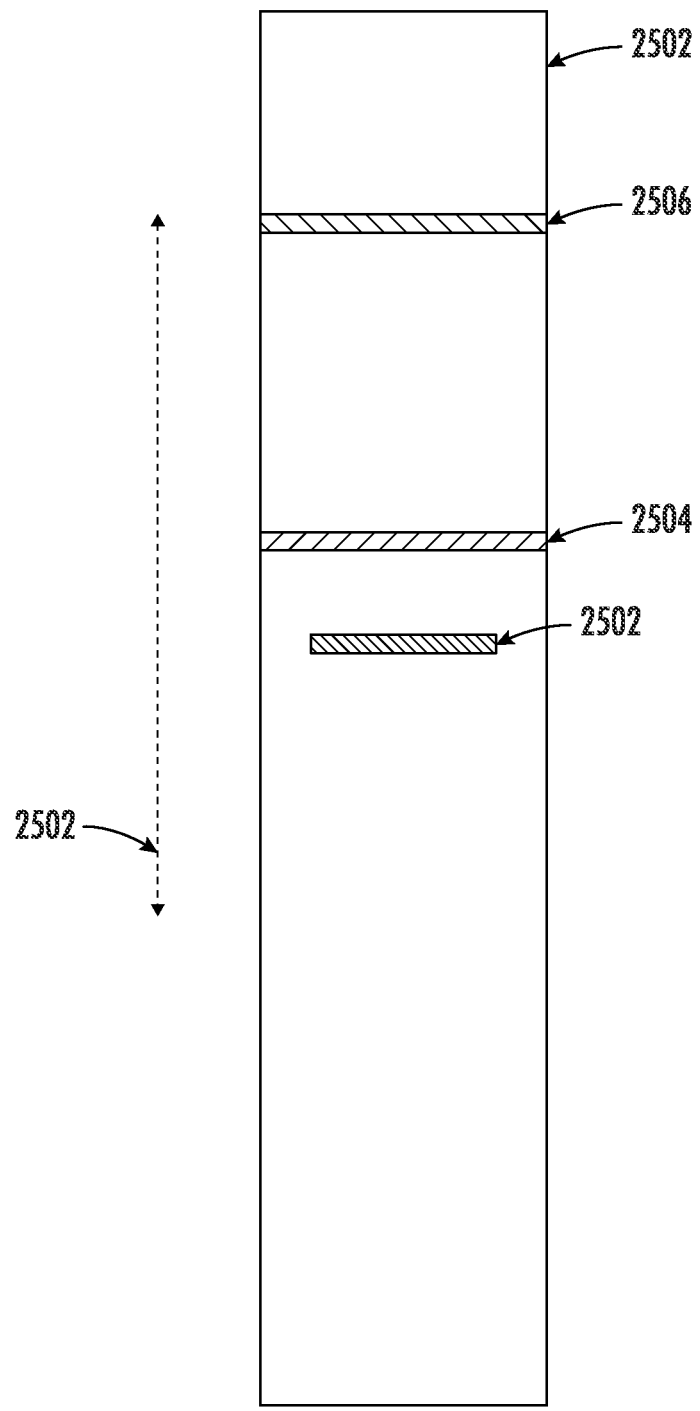
FIG. 20 is a top view of a lateral flow test strip according to some embodiments of the present disclosure.

As illustrated in FIG. 15, a lateral flow test strip reader 2000 for reading an output of a lateral flow assay to determine a presence or absence or amount of a target in a sample is shown. The lateral flow test strip reader 2000 includes a housing 2002 and an opening 2004 for a receptacle 2006 for receiving a lateral flow test strip 2500. As shown in FIG. 20, the lateral flow test strip 2500 includes a substrate 2502 with a control region 2504 and a sample test region 2506. The lateral flow test strip substrate 2502 may include configurations described herein, including a sample pad, a conjugate pad having upconverting nanoparticles (UCNPs) conjugated to an analyte binding molecule, and an absorbent pad configured for fluid communication when a sample is applied. As shown in FIG. 15, the lateral flow test strip reader 2000 may include a display 2006 for displaying the results of the reader 2000, such as whether a presence or absence of a target is detected, or an amount or concentration of the target.

Figure 16:
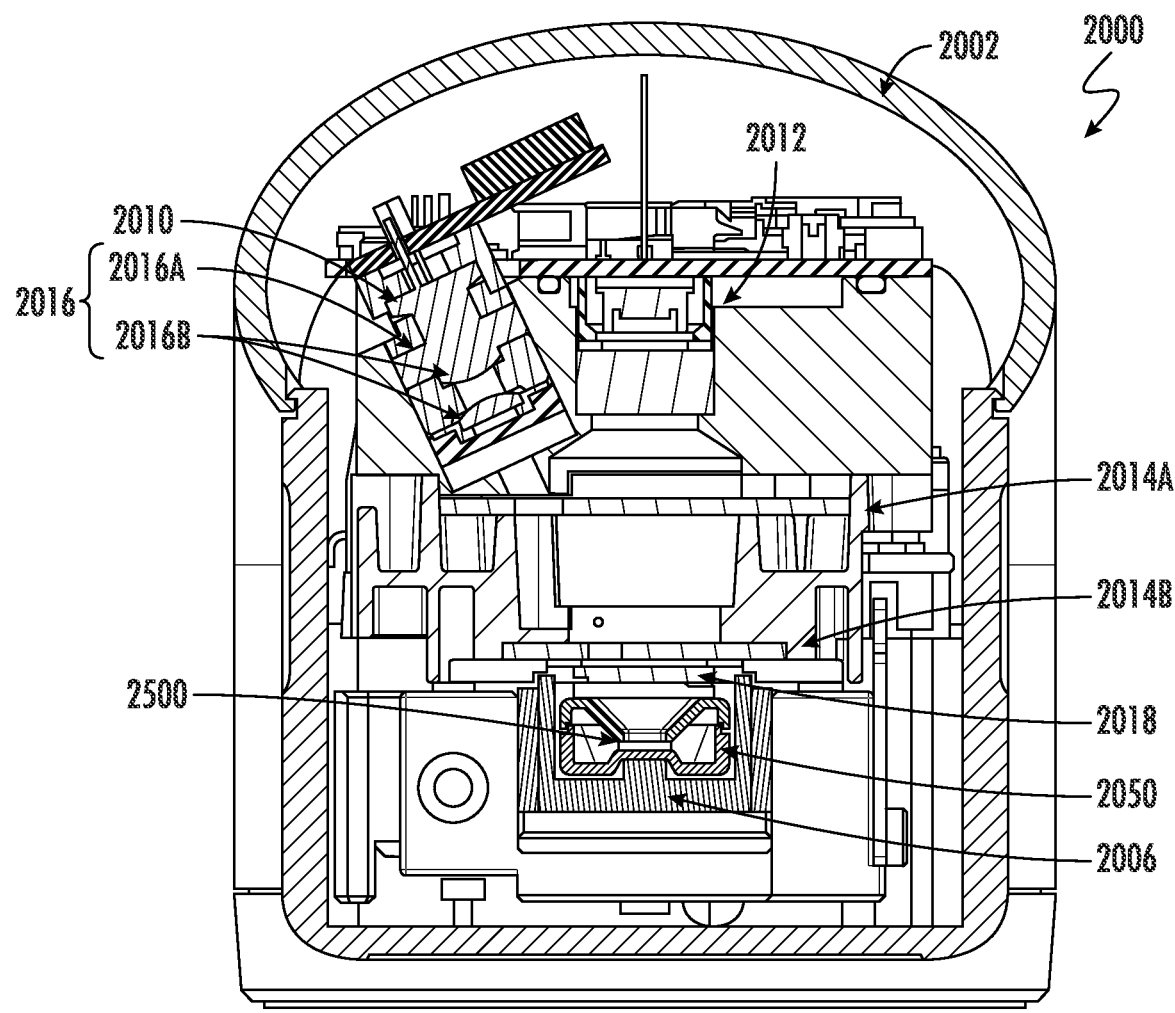
FIG. 16 is a cross sectional view of the lateral flow test strip reader of FIG. 15.
Figure 17:
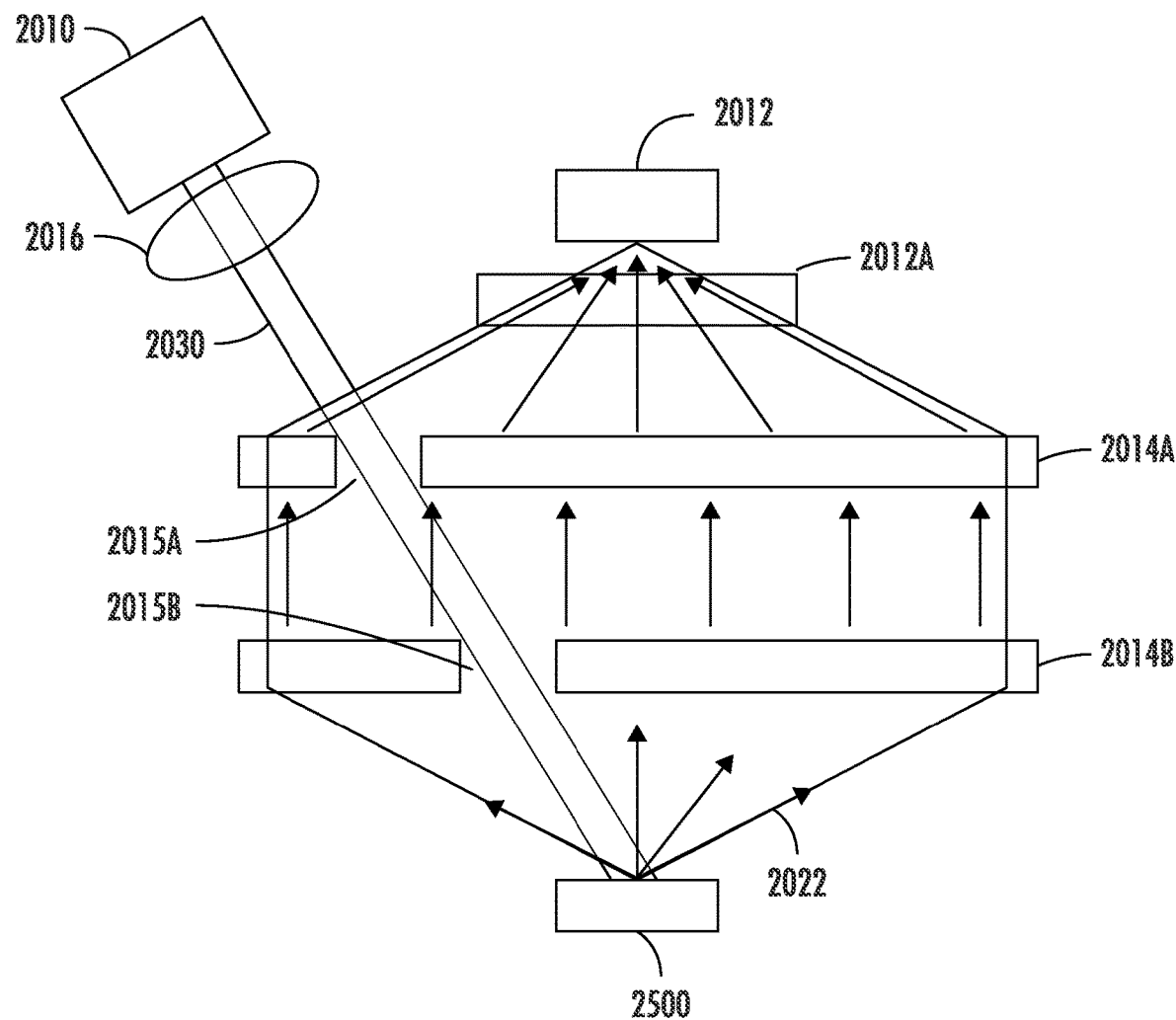
FIG. 17 is a schematic diagram of a lateral flow test strip reader according to some embodiments of the present disclosure.
Figure 18:
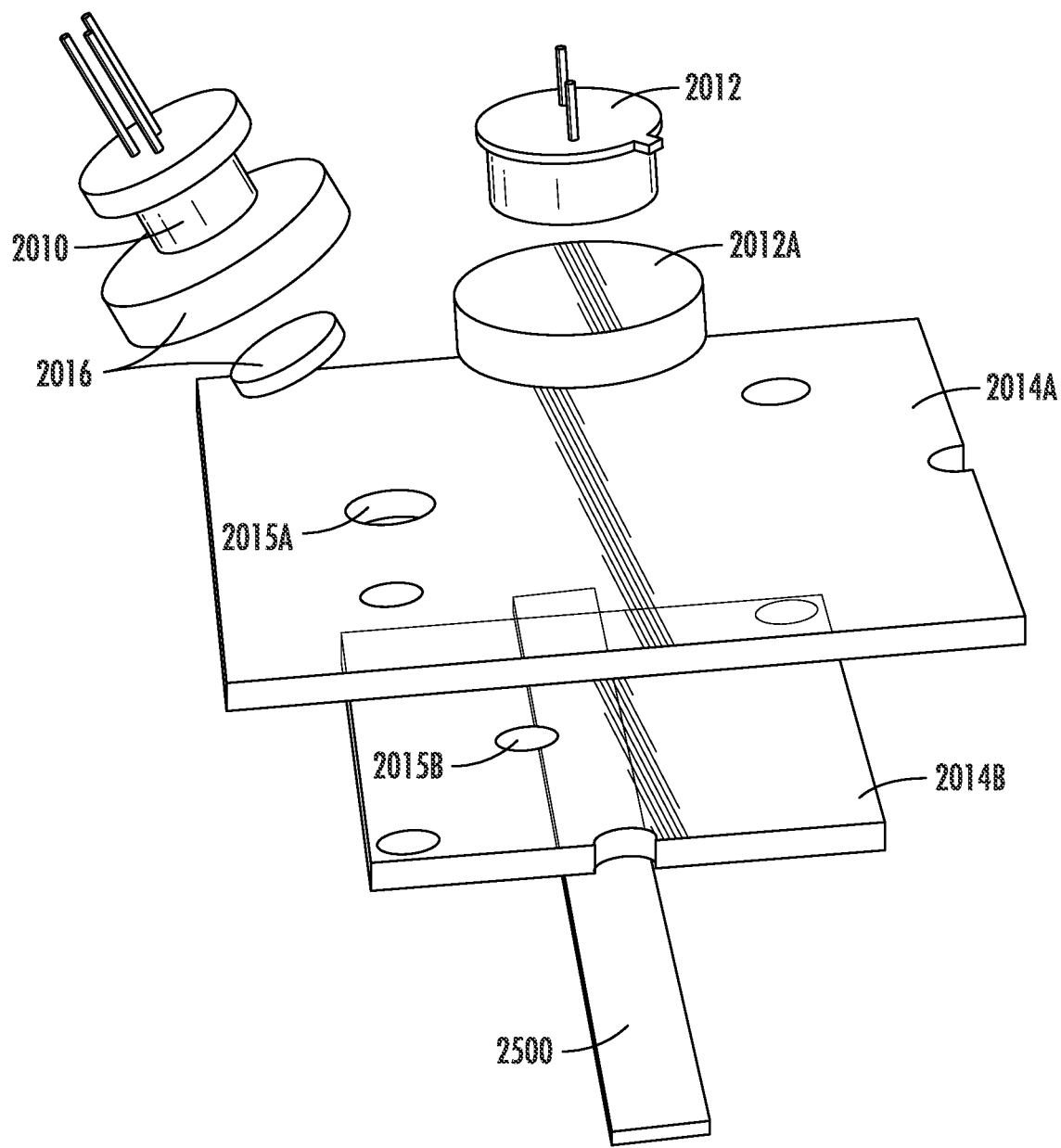
FIG. 18 is a perspective view of an optical configuration of a lateral flow test strip reader according to some embodiments of the present disclosure.

As illustrated in FIGS. 16-18, the lateral flow test strip reader 2000 includes a light source 2010, an optical detector 2012, lenses 2014A, 2014B, a filter 2013, and a transparent window 2018. The light source 2010 includes optical lenses 2016, such as an IR lens 2016A and a Plano convex lens 2016B. However, any suitable optical configuration may be used to focus light from the light source 2010 to the lateral flow test strip 2500 in the receptacle 2006. The lateral flow test strip reader 2000 includes an optical detector 2012 and lenses 2014A, 2014B. The lenses 2014A, 2014B include respective excitation light transmission regions 2015A, 2015B and excitation light directing regions 2017A, 2017B. The receptacle 2006 is operatively connected to a heater 2050 that is configured to heat the receptacle 2006 and/or lateral flow test strip 2500. The receptacle 2006 can be sealed by a door or latch to seal the inside of the lateral flow test strip reader 2000.

The light source 2010 is configured to generate an excitation light 2030 (FIGS. 17-18) that is impinged on a test region and/or control region of a lateral flow test strip 2500 that is positioned in the receptacle 2006. The lenses 2014A, 2014B direct light emitted from the lateral flow test strip 2500 to the optical detector 2012 through the filter 2013, which is configured to filter the excitation light beam from the detected image.

In this configuration, the excitation light transmission regions 2015A, 2015B are configured to transmit the excitation light 2030 from the light source 2010 to at least one of the test region 2506 and the control region 2504 of the lateral flow test strip 2500. In some embodiments, the excitation light transmission regions 2015A, 2015B are apertures in each of the respective lenses 2014A, 2014B and are configured to allow passage of the excitation light to at least one of the test region 2506 and the control region 2504. The lenses 2015A, 2015B may be Fresnel lenses that are substantially flat to reduce the space or height required in the lateral flow test strip reader 2000. However, any suitable lenses 2015A, 2015B may be used with light directing regions 2017A, 2017B configured to focus light from the lateral flow test strip 2500 to the optical detector 2012.

As illustrated in FIG. 17, light is emitted from the lateral flow test strip 2500 in various directions. The light directing region 2017B of the lens 2014B collimates the emitted light in a single direction towards the lens 2014A. The light directing region 2017A of the lens 2014A focuses the collimated light to the optical detector 2012. In contrast, the excitation light 2030 from the light source 2010 passes through the excitation light transmission regions 2015A, 2015B of the respective lenses 2014A, 2014B to the lateral flow test strip 2500. Therefore, the lenses 2014A, 2014B include excitation light transmission regions 2015A, 2015B with optical properties that are different than the optical properties of the light directing region 2017A, 2017B. In some embodiments, the excitation light transmission regions 2015A, 2015B do not change the optical properties of the excitation light 2030, and the light directing regions 2017A, 2017B focus the emission signals from the lateral flow test strip 2500 to the optical detector 2012. For example, the excitation light transmission regions 2015A, 2015B may be an aperture or a transmissive window that permits the excitation light 2030 to transmit to the lateral flow test strip 2500, while the light directing regions 2017A, 2017B may change a direction of the light, such as to direct the emission signals from the lateral flow test strip 2500 to the optical detector 2012. In some embodiments, the light directing regions 2017A, 2017B are configured as Fresnel lenses.

Although some embodiments are illustrated with respect to two lenses 2014A, 2014B, it should be understood that other optical configurations may be used, including those with one, two, three or more lenses. The excitation light 2030 from the light source 2010 may be a laser beam and/or the light source 2010 may be a laser diode including focusing optics, for example, as described with respect to FIGS. 1-6. The light source 2010 may be positioned off-axis from the optical detector 2012 such that the direction of the excitation light 2030 from the light source 2010 is at an angle with respect to the direction that the lenses 2014A, 2014B direct the emission signals from the lateral flow test strip 2500 to the optical detector 2012.

In some embodiments, an optional heater 2050 (FIG. 16) is configured to heat the lateral flow test strip 2500 to a temperature above ambient temperature to provide an enhanced emissions signal. The heater 2050 may include a temperature sensor and a temperature controller. The temperature sensor is in thermal communication with the lateral flow test strip receptacle 2006. The temperature sensor may output a temperature signal, and the temperature controller is configured to receive the temperature signal from the temperature sensor and to control the heat output of the heater 2050 in response to the temperature signal. In some embodiments, the temperature of the lateral flow test strip 2500 is maintained at about 37 degrees Celsius; however, any suitable temperature may be used, such as between 35 and 40 degrees Celsius or between 30 and 45 degrees Celsius. Higher temperatures or variable temperatures (thermocycle) may be used.

As illustrated in FIG. 16 the lateral flow test strip receptacle 2006 includes an indentation or groove 2006A to permit closer thermal contact between the heater 2050 and the lateral flow test strip 2500. However, the groove 2006A may be omitted, and the heater 2050 may be positioned sufficiently close to the lateral flow test strip receptacle 2006 for controlling the temperature of the receptacle 2006 and lateral flow test strip 2500.

The window 2018 may used to isolate the sample in the lateral flow test strip 2500 from the optical elements of the lateral flow test strip reader 2000. In some embodiments, the optical elements of the lateral flow test strip reader 2000 such as the lenses 2014A, 2014B, the optical lenses 2016, the filter 2013 and the optical detector 2012 may be isolated from the outside environment by the window 2018, and dust may be removed from the outside surface of the window 2018 without opening the lateral flow test strip reader 2000.

In some embodiments, the lateral flow test strip receptacle 2006 includes an actuator configured to move the lateral flow test strip 2500 from one position to another position within the lateral flow test strip reader 2000. As illustrated in FIG. 20, the actuator may move the lateral flow test strip 2500 along a distance D so that the excitation light 2030 from the light source 2010 is directed at the test region 2504 in one position and the control region 2506 in the other position. However, it should be understood that any suitable configuration may be used to direct light to both the test region 2504 and/or the control region 2506, including using an elongated excitation light as described with respect to FIGS. 1-6.

As illustrated in FIG. 20, the shape of the excitation light 2030 is generally rectangular so that it illuminates a line-shaped test or control region 2504, 2506 in the horizontal direction to include an increased area of the test or control region 2504, 2506, which is also rectangular in shape. Any suitable excitation light shape may be used. In some embodiments, the rectangular shape of the excitation light may be formed from a laser diode (e.g., as light source 2010) and/or beam shaping optics. The rectangular shape of the excitation light 2030 may increase accuracy because the rectangular shape conforms to the test or control regions 2504, 2506, which may include small regions with lower signal due to imperfect liquid flow.

Figure 19:
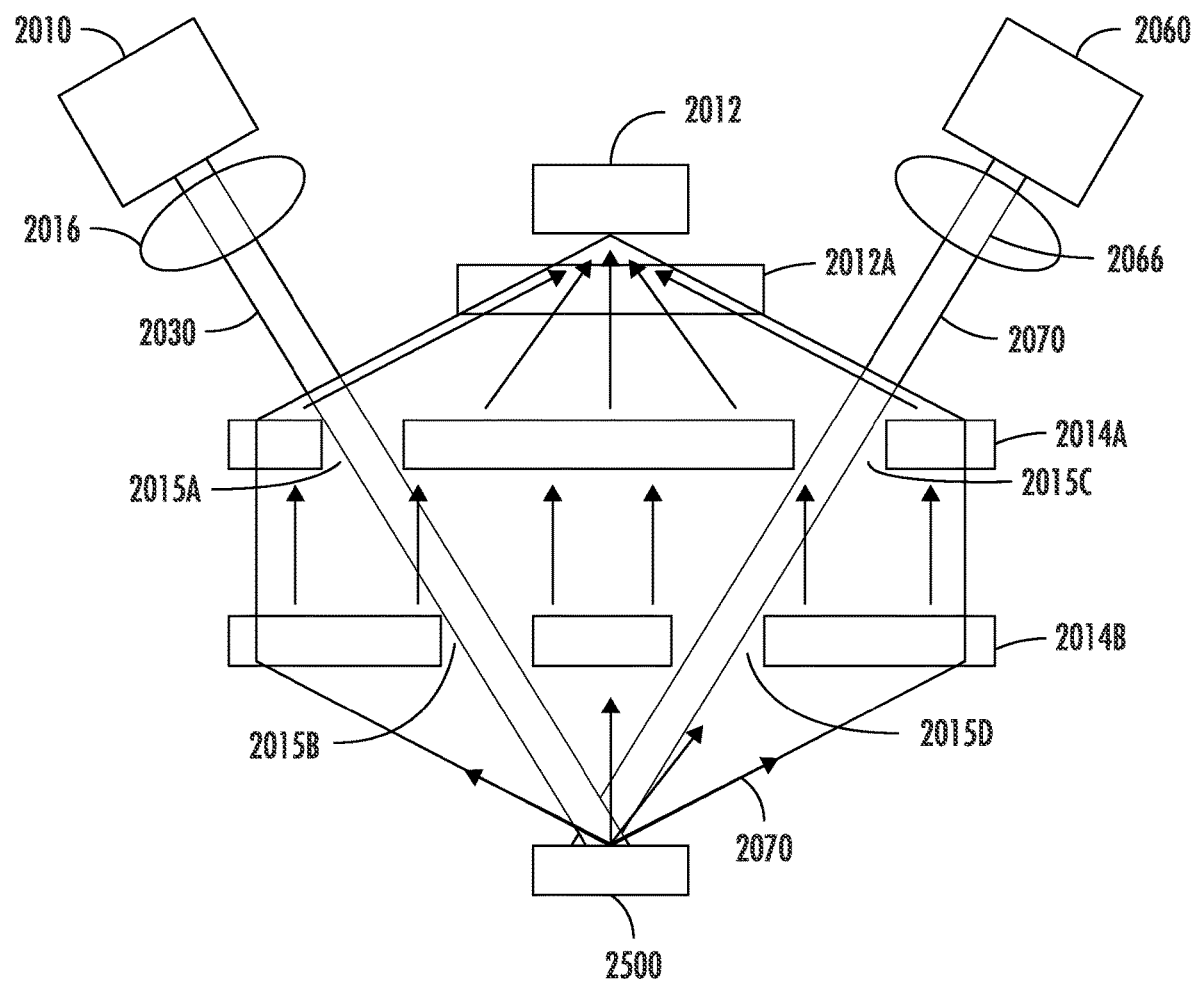
FIG. 19 is schematic diagram of a lateral flow test strip reader according to some embodiments of the present disclosure.

Although the lenses 2014A, 2014B are illustrated with a light source 2010 and apertures or excitation light transmission regions 2015A, 2015B, respectively, additional light sources and/or excitation light transmission regions may be used. As illustrated in FIG. 19, the lenses 2014A, 2014B include additional apertures 2015C, 2015D that are configured to allow excitation light 2070 from another light source 2060 with focusing optics 2066 to transmit another excitation light beam to the sample in the lateral flow test strip 2500. The additional light source 2060 may be any suitable light source. In some embodiments, the additional light source 2060 is a visible range laser diode for colorimeteric detection of bands on the lateral flow test strip 2500. In some embodiments, the additional light source 2060 may be an LED of a particular wavelength or color or a white LED may be used, and in some embodiments, other assays that do not utilize upconverting nanoparticles (UCNPs) may be used alone or in combination with the utilize upconverting nanoparticles (UCNPs) assays described herein. In some embodiments, the same optical detector 2012 may be used to detect light emissions from the lateral flow test strip 2500 from both light sources 2010, 2060 at the same time or the emissions may be detected sequentially.

The lateral flow test strip reader 2000 may be used to detect emission signals indicating a presence or absence of a target in the sample and/or a quantity of a target in the sample. A signal analyzer may be used to analyze the emission signals detected by the optical detector 2012 for the test region 2506 and the control region 2504 of the lateral flow test strip 2500 to determine an amount of a target in the sample as described herein and/or a transmitter may be used to transmit signals or images from the optical detector 2012 for remote analysis.

Figure 21:
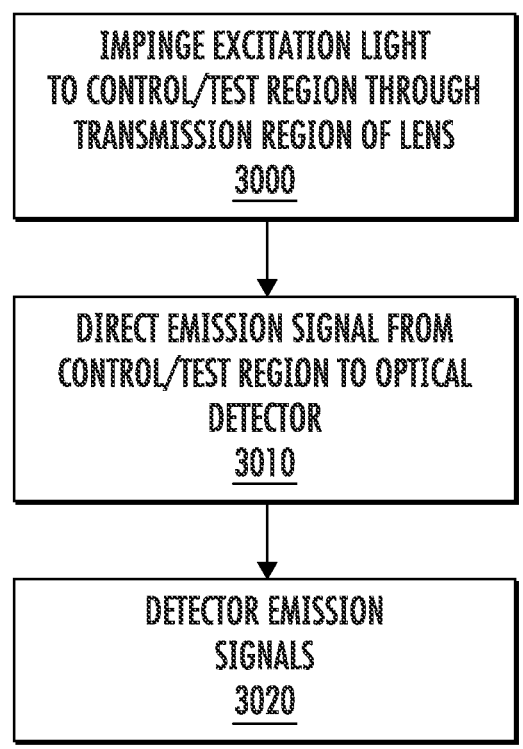
FIG. 21 is a flowchart of operations using the lateral flow test strip reader according to some embodiments.

As illustrated in FIG. 21, the light source 2010 may be used to impinge excitation light to the control region 2504 and/or test region 2506 of the lateral flow test strip 2500 (Block 3000). The excitation light passes through the transmission regions 2015A, 2015B of the lenses 2014A, 2014B. The lenses direct emission signals from the control region 2504 and/or test region 2506 of the lateral flow test strip 2500 to the optical detector 2012 (Block 3010). The optical detector 2012 detects emission signals (Block 3020), and the detected emission signals indicate a presence or absence of the target in the sample. In some embodiments, the detected emission signal indicates the amount or concentration of the target in the sample as described herein.

The foregoing is illustrative and is not to be construed as limiting thereof. Although a few exemplary embodiments have been described, those skilled in the art will readily appreciate that many modifications are possible in the exemplary embodiments without materially departing from the novel teachings disclosed. Accordingly, all such modifications are intended to be included within the scope of this invention as defined in the claims. Therefore, it is to be understood that the foregoing is illustrative and the invention set forth in the claims is not to be construed as limited to the specific embodiments disclosed, and that modifications to the disclosed embodiments, as well as other embodiments, are intended to be included within the scope of the appended claims. The invention is thus defined by the following claims, with equivalents of the claims to be included therein.

That which is claimed is:

1. A method of evaluating and/or monitoring function and/or viability of an embryo grown in vitro, the method comprising:
   contacting a lateral flow assay strip and a fluid sample comprising culture media in which the embryo was cultured, wherein the fluid sample contacts a labeled conjugate comprising an up-converting nanoparticle (UCNP) that binds to a target analyte, when present in the fluid sample, and the lateral flow assay strip comprises an absorbent pad with a test region and a control region such that the fluid sample flows by capillary action through the absorbent pad to produce a signal at the test region, when the target analyte is present;
   generating an excitation laser light beam;
   optically expanding the excitation laser light beam in a direction across the control region and the test region such that the excitation laser light beam is configured to simultaneously impinge and excite both the test region and the control region; and
   detecting an image comprising a test signal and a control signal simultaneously from the test region and the control region, respectively, wherein the test signal indicates the presence of the target analyte due to photon emission of the up-converting nanoparticle (UCNP).

2. The method of claim 1, wherein the method provides a limit of detection for the target analyte comprising human chorionic gonadotropin (hCG) of less than 25, 10, 1, 0.5 or 0.3 mIU/mL, optionally wherein the method provides a limit of detection for the target analyte comprising human chorionic gonadotropin (hCG) of about 0.1 or 0.2 mIU/mL to about 0.3, 0.5, or 1 mIU/mL.

3. The method of claim 1, wherein the method is performed in less than 30 minutes, optionally wherein the method is performed in about 1, 5, or 10 minute(s) to about 15, 20, 25, or 30 minutes.

4. The method of claim 1, wherein the culture media is media in which the embryo was cultured at day 1, 2, 3, 4, 5, 6, 7, 8, or 9 after fertilization of the embryo, optionally wherein the culture media is media in which the embryo was cultured at day 4, 5, or 6 after fertilization of the embryo.

5. The method of claim 1, further comprising obtaining the culture media, wherein obtaining the culture media comprises taking all or a portion of media in which the embryo is cultured.

6. The method of claim 1, wherein obtaining the culture media comprises taking about 1, 5, 10, or 20 µL to about 30, 40, 50, 60, 70, 80, 90, or 100 µL of media in which the embryo is cultured, optionally wherein obtaining the culture media comprises taking about 1 µL to about 50 µL of media in which the embryo is cultured.

7. The method of claim 1, further comprising contacting the lateral flow assay strip and a running buffer, optionally wherein the running buffer comprises a salt in an amount of about 250 or 500 mM to about 750 or 1000 mM.

8. The method of claim 7, wherein the fluid sample and/or running buffer has a pH of about 5, 5.5, 6, 6.5, or 7 to about 7.5, 8, 8.5, 9, 9.5 or 10.

9. The method of claim 7, wherein contacting the lateral flow assay strip and the fluid sample comprises contacting the lateral flow assay strip and the culture media and subsequently contacting the lateral flow assay strip and the running buffer.

10. The method of claim 7, wherein the culture media and running buffer are combined to provide a sample and contacting the lateral flow assay strip and the fluid sample comprises contacting the sample and the lateral flow assay strip.

11. The method of claim 1, wherein the fluid sample and labeled conjugate are contacted prior to contacting the lateral flow assay strip and the fluid sample, wherein the labeled conjugate comprising the up-converting nanoparticle (UCNP) is added into the fluid sample in a pre-incubation well for a time sufficient to allow binding between the labeled conjugate and the target analyte and the fluid sample comprising the labeled conjugate is contacted to the lateral flow assay strip.

12. The method of claim 1, wherein the labeled conjugate is present on a portion of the lateral flow assay strip on and/or in a conjugate pad of the lateral flow assay strip and the fluid sample contacts the labeled conjugate via capillary action through the portion of the lateral flow assay strip.

13. The method of claim 1, wherein the embryo is grown and/or cultured in a cell culture container comprising the culture media, optionally wherein the embryo is grown and/or cultured at a controlled temperature and/or in an incubator.

14. The method of claim 1, wherein the contacting comprises contacting a first lateral flow assay strip and a first fluid sample comprising first culture media in which the embryo was cultured and detecting a first test signal at the test region, wherein the first test signal indicates the presence of the target analyte in the first culture media; and
the method further comprises:
contacting a second lateral flow assay strip and a second fluid sample comprising second culture media in which the embryo was cultured and detecting a second test signal at the test region, wherein the second test signal indicates the presence of the target analyte in the second culture media, wherein the first and second culture media are obtained from different days after fertilization of the embryo.

15. The method of claim 14, further comprising quantifying the amount of the target analyte in the first and second culture media based on an intensity of the first and second test signal.

16. The method of claim 1, wherein an intensity of the test signal indicates an amount of the target analyte in the fluid sample.

17. The method of claim 1, wherein the labeled conjugate comprising the up-converting nanoparticle (UCNP) is configured to emit the test signal at the test region upon excitation by a light source, the test signal comprising a visible and/or ultraviolet radiation signal at a test signal intensity in the test region.

18. The method of claim 17, further comprising determining an amount of the target analyte in the fluid sample based on the test signal intensity in the test region compared to a control signal intensity in the control region.

19. The method of claim 1, wherein the excitation laser light beam comprises an expanded projection of a line shape that is configured to extend continuously across the test region and the control region.

20. The method of claim 1, wherein at least one lens is between the light source and the lateral flow assay strip, wherein the at least one lens is configured to optically expand the excitation laser light beam to an expanded projection of a line shape that is configured to extend continuously across the test region and the control region.

* * * * *